(12) United States Patent
Wu et al.

(10) Patent No.: US 12,302,288 B2
(45) Date of Patent: May 13, 2025

(54) COMMUNICATION METHOD AND APPARATUS

(71) Applicant: HUAWEI TECHNOLOGIES CO., LTD., Guangdong (CN)

(72) Inventors: Yedan Wu, Shanghai (CN); Tingting Geng, Shanghai (CN); Lili Zheng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 409 days.

(21) Appl. No.: 17/703,118

(22) Filed: Mar. 24, 2022

(65) Prior Publication Data

US 2022/0217676 A1    Jul. 7, 2022

Related U.S. Application Data

(63) Continuation of application No. PCT/CN2019/109068, filed on Sep. 29, 2019.

(51) Int. Cl.
*H04W 4/029* (2018.01)
*H04W 68/02* (2009.01)

(52) U.S. Cl.
CPC .......... *H04W 68/02* (2013.01); *H04W 4/029* (2018.02)

(58) Field of Classification Search
None
See application file for complete search history.

(56) References Cited

U.S. PATENT DOCUMENTS

| 2011/0096721 | A1 | 4/2011 | Kamalaraj et al. | |
| 2018/0262903 | A1* | 9/2018 | Ryan | H04W 4/021 |
| 2020/0275257 | A1* | 8/2020 | Gupta | H04W 24/08 |

FOREIGN PATENT DOCUMENTS

| CN | 101969600 A | 2/2011 |
| CN | 107786944 A | 3/2018 |
| JP | 2018117272 A | 7/2018 |
| WO | 2019080056 A1 | 5/2019 |

OTHER PUBLICATIONS

3GPP TR 38.821 V0.7.0 (May 2019), "3rd Generation Partnership Project; Technical Specification Group Radio Access Network; Solutions for NR to support non-terrestrial networks (NTN) (Release 16)," May 2019, 86 pages.

(Continued)

*Primary Examiner* — Willie J Daniel, Jr.
(74) *Attorney, Agent, or Firm* — Fish & Richardson P.C.

(57) ABSTRACT

Example communication methods and apparatus are described. One example method includes receiving first information from a first device, where the first information indicates N moments and location information of the first device at the N moments. The first device obtains second information, where the second information indicates a correspondence between the N moments and M area identifiers, or the second information indicates a correspondence between N locations and M area identifiers. According to the foregoing technical solution, the first device sends the location information of the first device at the N moments, so that the M area identifiers corresponding to the first device at the N moments or the M area identifiers corresponding to N pieces of location information can be obtained.

20 Claims, 11 Drawing Sheets

(56) References Cited

OTHER PUBLICATIONS

Huawei, "Consideration on the paging issues," 3GPP TSG-RAN WG3 Meeting #102, R3-186696, Spokane, USA, Nov. 12-16, 2018, 2 pages.
Mitsubishi Electric, "Idle Mode UEs in Non-Terrestrial Networks (NTN)," 3GPP TSG RAN WG3 Meeting #103bis, R3-191856, Xi'an, China, Apr. 8-12, 2019, 5 pages.
Nokia et al., "Paging issues in NTN," 3GPP TSG-RAN WG3 #101bis, R3-185700, Chengdu, China, Oct. 8-12, 2018, 8 pages.
PCT International Search Report and Written Opinion issued in International Application No. PCT/CN2019/109068 on Jun. 30, 2020, 15 pages (with English translation).
Fraunhofer IIS, Fraunhofer HHI, "NR-NTN: Tracking Areas and Paging in NGSO Satellite Systems," 3GPP TSG-RAN WG3 Meeting #101bis, R3-185849, Chengdu, China, Oct. 8-12, 2018, 4 pages.
Office Action issued in Chinese Application No. 201980098721.1 on Aug. 1, 2022, 10 pages.
TNO, Thales, HNS, "New solution—Distributed gNB for non-GEO constellations," SA WG2 Meeting #S2-134, S2-1908556, Sapporo, Japan, Jun. 24-28, 2019, 3 pages.
Extended European Search Report issued in European Application No. 19946747.3 on Aug. 11, 2022, 7 pages.
Hughes, "NR-NTN: Paging in NGSO Satellite Systems," 3GPP TSG RAN WG3 Meeting #101, R3-184403, Gothemburg, Sweden, Aug. 20-24, 2018, 6 pages.
ZTE, Sanechips, "Tracking Area Management and Paging Handling in NTN," 3GPP TSG RAN WG3#103, R3-190139, Athens, Greece, Feb. 25-Mar. 1, 2019, 13 pages.

\* cited by examiner

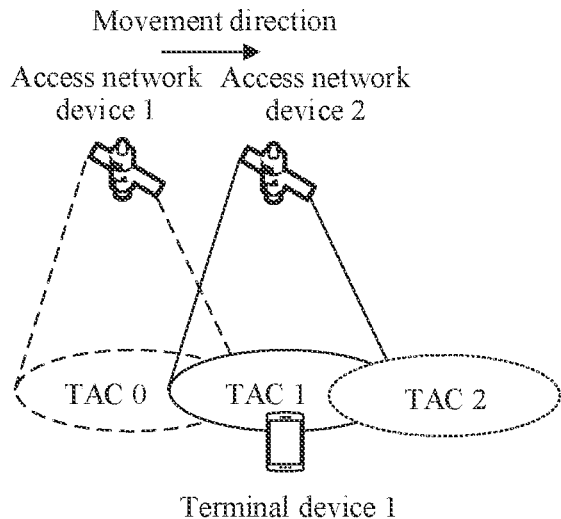 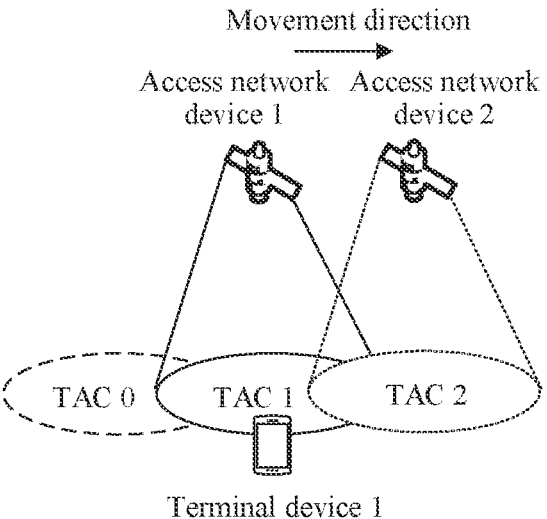
FIG. 4(a)　　　　　　　　　FIG. 4(b)
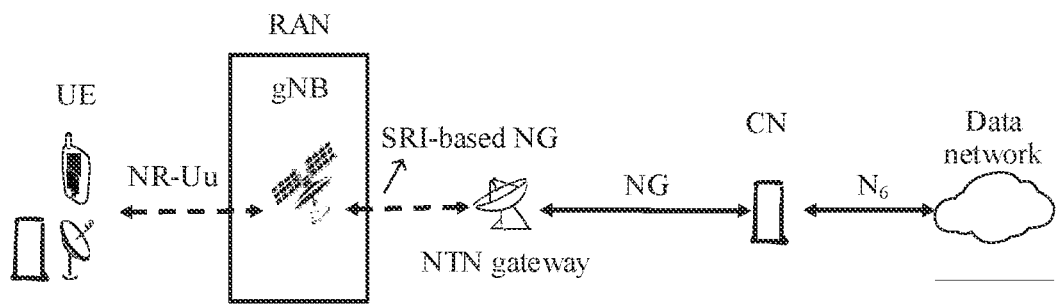
FIG. 5
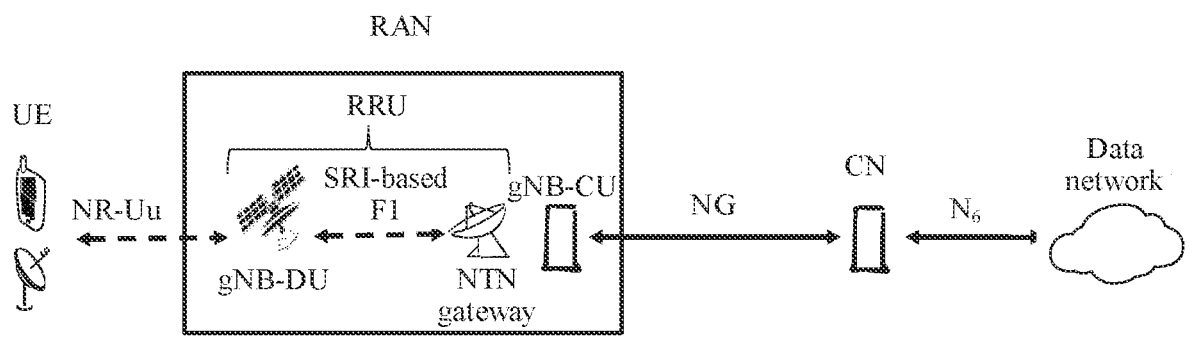
FIG. 6

US 12,302,288 B2

COMMUNICATION METHOD AND APPARATUS

CROSS-REFERENCE TO RELATED APPLICATIONS

This application is a confirmation of International Application No. PCT/CN2019/109068, filed on Sep. 29, 2019, the disclosure of which is hereby incorporated by reference in its entirety.

TECHNICAL FIELD

This application relates to the field of wireless communication technologies, and in particular, to a communication method and apparatus.

BACKGROUND

A conventional terrestrial network cannot provide seamless coverage for user equipment (UE), especially in a place in which a base station cannot be deployed, for example, a sea, a desert, or the air. Therefore, a non-terrestrial network (NTN) is introduced into a 5G (5th generation) system. In the NTN, a base station or a part of base station functions are deployed on a high-altitude platform or a satellite to provide seamless coverage for UE, and the high-altitude platform or the satellite is little affected by a natural disaster, so that reliability of the 5G system can be improved.

In NTN communication, when a base station is deployed on a low earth orbit (LEO) satellite, because the LEO satellite continuously moves relative to the ground, a coverage area of the LEO satellite on the ground continuously changes. Consequently, a core network device and the LEO satellite cannot learn of the coverage area of the LEO satellite on the ground, leading to low efficiency of paging a terminal device by the LEO satellite.

SUMMARY

This application provides a communication method and apparatus, so that a first device and a first core network device can quickly and efficiently exchange M area identifiers corresponding to the first device at N moments. Therefore, efficiency of paging a terminal device in a cell covered by the first device is improved.

According to a first aspect, a communication method is provided. The communication method includes: A first device sends first information, where the first information is used to indicate N moments and location information of the first device at the N moments. The first device obtains second information, where the second information is used to indicate a correspondence between the N moments and M area identifiers, or the second information is used to indicate a correspondence between N locations and M area identifiers, and N and M are positive integers.

The location information of the first device at the N moments may be understood as that each of the N moments corresponds to one piece of location information of the first device. Pieces of location information of the first device that correspond to the N moments may be all different, or the pieces of location information of the first device that correspond to the N moments include same location information of the first device.

Optionally, the first device sends the first information to a first core network device. The first device obtains the second information sent by the first core network device.

The first information is included in an NG (next generation) interface setup message. That the first information is included in an NG interface setup message may be understood as follows: When the first device sets up an NG interface with the first core network device, the first device sends the NG interface setup message to the first core network device, where the NG interface setup message carries the first information.

An $m^{th}$ TA in the M area identifiers is an area covered by the first device at a moment or a location corresponding to an $m^{th}$ area identifier, and $m \in [1, M]$.

In this technical solution of this application, the first device sends location information of the first device at each moment, to obtain an identifier of an area covered by the first device at each location, so that the first device and the first core network device exchange in time the area covered by the first device. Therefore, the first device obtains in time the area covered by the first device, and storage load of the first device is reduced.

With reference to the first aspect, in some implementations of the first aspect, the method further includes: The first device sends the second information to at least one third device.

The first device sends, to the at least one third device, the identifier of the area covered by the first device at each location. Therefore, flexibility of a communication system is improved.

With reference to the first aspect, in some implementations of the first aspect, the second information is included in an Xn interface setup request message.

The second information is included in the Xn interface setup request message, so that signaling overheads can be reduced.

With reference to the first aspect, in some implementations of the first aspect, the first device includes a distributed unit (DU), and that a first device sends first information includes: The first device sends the first information to a second device, where the second device includes a centralized unit (CU).

With reference to the first aspect, in some implementations of the first aspect, that the first device obtains second information includes: The first device receives the second information sent by the second device, where the second information is generated by the second device, or the second information is generated by the first core network device.

According to a second aspect, a communication method is provided. The communication method includes: A second device receives first information sent by a first device, where the first information is used to indicate N moments and location information of the first device at the N moments. The second device obtains second information, where the second information is used to indicate a correspondence between the N moments and M area identifiers, or the second information is used to indicate a correspondence between N locations and M area identifiers, and N and M are positive integers. The second device sends the second information to the first device.

In this embodiment of this application, the second device receives location information that is of the first device at each moment and that is sent by the first device, to obtain an identifier of an area covered by the first device at each location, so that the first device and the second device exchange in time the area covered by the first device.

With reference to the first aspect or the second aspect, in a possible implementation, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

The first device sends latitude and longitude information of the first device at the N moments to the first core network device, to obtain area identifiers corresponding to the first device at the N moments or area identifiers corresponding to the latitude and longitude information of the first device at the N moments, so that the first device and the first core network device can exchange in time the area covered by the first device. Therefore, the first device obtains in time the area covered by the first device, and the storage load of the first device is reduced.

With reference to the first aspect or the second aspect, in a possible implementation, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M groups of area identifiers.

The first device sends latitude and longitude information, at the N moments, of each cell covered by the first device to the first core network device, to obtain area identifiers, at the N moments, corresponding to each cell covered by the first device or area identifiers corresponding to the latitude and longitude information, at the N moments, of each cell covered by the first device, so that the first device and the first core network device can accurately exchange in time the area covered by the first device. Therefore, the first device obtains in time the area covered by the first device, and the storage load of the first device is reduced.

With reference to the first aspect or the second aspect, in a possible implementation, the area identifier includes a tracking area code (TAC) or an access network area code (RANAC).

With reference to the first aspect or the second aspect, in a possible implementation, the first information is included in an F1 interface setup message or a first configuration update message.

The first information is included in the F1 interface setup message or the first configuration update message, so that signaling overheads can be reduced.

With reference to the first aspect or the second aspect, in a possible implementation, the second information is included in an F1 interface setup response message or a first configuration update response message.

The second information is included in the F1 interface setup response message or the first configuration update response message, so that signaling overheads can be reduced.

According to a third aspect, a communication method is provided. The communication method includes: receiving first information sent by a first device, where the first information is used to indicate N moments and location information of the first device at the N moments; generating second information based on the first information, where the second information is used to indicate a correspondence between the N moments and M area identifiers, or the second information is used to indicate a correspondence between N locations and M area identifiers, and N and M are positive integers; and sending the second information to the first device.

With reference to the third aspect, in a possible implementation, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

With reference to the third aspect, in a possible implementation, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M area identifiers.

With reference to the third aspect, in a possible implementation, the method further includes: receiving third information sent by the first device, where the third information is used to indicate N moments and location information of a fourth device at the N moments; generating fourth information based on the third information, where the second information is used to indicate a correspondence between the N moments and M area identifiers, or the second information is used to indicate a correspondence between N locations and M area identifiers; sending the fourth information to the fourth device; determining a fifth device corresponding to a first area identifier at a first moment based on the second information and the fourth information, where the first area identifier is an area identifier in an area identifier list of a to-be-paged terminal device, and the fifth device is one of the first device and the fourth device; and sending a first paging message to the fifth device.

A first core network device receives location information of each of a plurality of devices at each moment, to obtain an identifier of an area covered by each of the plurality of devices at each location, so that the plurality of devices and the first core network device exchange in time the area covered by each device, and the first core network device can determine an area in which the to-be-paged terminal device is located at the first moment and send a paging message to a corresponding device. Therefore, the first core network device can effectively page the terminal device, and efficiency of paging the terminal device by the first core network device is improved.

With reference to the third aspect, in a possible implementation, the third information includes the N moments and N groups of latitude and longitude information of the fourth device at the N moments; and the fourth information includes the correspondence between the N moments and the M area identifiers, or the fourth information includes a correspondence between N pieces of latitude and longitude information and the M area identifiers.

With reference to the third aspect, in a possible implementation, the third information includes the N moments and N groups of latitude and longitude information of the fourth device at the N moments, each of the N groups of latitude and longitude information includes latitude and longitude information of at least one cell, and the at least one cell is at least one cell covered by the fourth device; and the fourth information includes a correspondence between the N moments and M groups of area identifiers, or the fourth information includes a correspondence between the N groups of latitude and longitude information and M area identifiers.

With reference to the third aspect, in a possible implementation, the area identifier includes a tracking area code (TAC) or an access network area code (RANAC).

With reference to the third aspect, in a possible implementation, the first information is included in an NG interface setup message or an Xn interface setup request message, and the second information is included in an NG interface setup response message or aft Xn interface setup request message.

The first information is included in the NG interface setup message or the Xn interface setup request message, and the second information is included in the NO interface setup response message or the Xn interface setup request message, so that signaling overheads can be reduced.

With reference to the third aspect, in a possible implementation, the third information is included in an NG interface setup message or an Xn interface setup request message, and the fourth information is included in an NG interface setup response message or an Xn interface setup request message.

The third information is included in the NO interface setup message or the Xn interface setup request message, and the fourth information is included in the NO interface setup response message or the Xn interface setup request message, so that signaling overheads can be reduced.

According to a fourth aspect, a communication apparatus is provided. The apparatus includes: a sending unit, configured to send first information, where the first information is used to indicate N moments and location information of a first device at the N moments; and a receiving unit, configured to obtain second information, where the second information is used to indicate a correspondence between the N moments and M area identifiers, or the second information is used to indicate a correspondence between N locations and M area identifiers, and N and M are positive integers.

With reference to the fourth aspect, in a possible implementation, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

With reference to the fourth aspect, in a possible implementation, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M groups of area identifiers.

With reference to the fourth aspect, in a possible implementation, the area identifier includes a tracking area code (TAC) or an access network area code (RANAC).

With reference to the fourth aspect, in a possible implementation, the sending unit is further configured to: send the second information to at least one third device.

With reference to the fourth aspect, in a possible implementation, the second information is included in an Xn interface setup request message.

According to a fifth aspect, a communication apparatus is provided. The apparatus includes: a receiving unit, configured to receive first information sent by a first device, where the first information is used to indicate N moments and location information of the first device at the N moments; a processing unit, configured to generate second information based on the first information, where the second information is used to indicate a correspondence between the N moments and M area identifiers, or the second information is used to indicate a correspondence between N locations and M area identifiers, and N and M are positive integers; and a sending unit, configured to send the second information to the first device.

With reference to the fifth aspect, in a possible implementation, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

With reference to the fifth aspect, in a possible implementation, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M area identifiers.

With reference to the fifth aspect, in a possible implementation, the receiving unit is further configured to: receive third information sent by a fourth device, where the third information is used to indicate N moments and location information of the fourth device at the N moments; the processing unit is further configured to generate fourth information based on the third information, There the fourth information is used to indicate a correspondence between the N moments and M area identifiers, or the fourth information is used to indicate a correspondence between N locations and M area identifiers; the sending unit is further configured to send the fourth information to the fourth device; the processing unit is further configured to determine a fifth device corresponding to a first area identifier at a first moment based on the second information and the fourth information, where the first area identifier is an area identifier in an area identifier list of a to-be-paged terminal device, and the fifth device is one of the first device and the fourth device; and the sending unit is further configured to send a first paging message to the fifth device.

With reference to the fifth aspect, in a possible implementation, the third information includes the N moments and N groups of latitude and longitude information of the fourth device at the N moments; and the fourth information includes the correspondence between e N moments and the M area identifiers, or the fourth information includes a correspondence between N pieces of latitude and longitude information and the M area identifiers.

With reference to the fifth aspect, in a possible implementation, the third information includes the N moments and N groups of latitude and longitude information of the fourth device at the N moments, each of the N groups of latitude and longitude information includes latitude and longitude information of at least one cell, and the at least one cell is at least one cell covered by the fourth device; and the fourth information includes a correspondence between the N moments and M groups of area identifiers, or the fourth information includes a correspondence between the N groups of latitude and longitude information and M area identifiers.

With reference to the fifth aspect, in a possible implementation, the area identifier includes a tracking area code (TAC) or an access network area code (RANAC).

With reference to the fifth aspect, in a possible implementation, the first information is included in an NG interface setup message or an Xn interface setup request message, and the second information is included in an NG interface setup response message or an Xn interface setup request message.

With reference to the fifth aspect, in a possible implementation, the third information is included in an NG interface setup message or an Xn interface setup request message, and the fourth information is included in an NG interface setup response message.

According to a sixth aspect, a communication apparatus is provided. The apparatus includes: a distributed unit (DU), configured to send first information to a second apparatus, where the first information is used to indicate N moments and location information of the DU at the N moments, where the DU is further configured to receive second information sent by the second apparatus, where the second information is generated by the second apparatus, or the second information is generated by a first core network device; and the second information is used to indicate a correspondence between the N moments and M area identifiers, or the second information is used to indicate a correspondence between N locations and M area identifiers, and N and M are positive integers.

With reference to the sixth aspect, in a possible implementation, the first information includes the N moments and N groups of latitude and longitude information of the DU at the N moments; and the second information includes the correspondence between the N moments and the M area identifiers, or the second information includes a correspondence between N pieces of latitude and longitude information and the M area identifiers.

With reference to the sixth aspect, in a possible implementation, the first information includes the N moments and N groups of latitude and longitude information of the DU at the N moments, each of the N groups of latitude and longitude information includes latitude and longitude information of at least one cell, and the at least one cell is at least one cell covered by the DU; and the second information includes a correspondence between the N moments and M groups of area identifiers, or the second information includes a correspondence between the N groups of latitude and longitude information and M groups of area identifiers.

With reference to the sixth aspect, in a possible implementation, the first information is included in an F1 interface setup message or a first configuration update message; and the second information is included in an F1 interface setup response message or a first configuration update response message.

With reference to the sixth aspect, in a possible implementation, the area identifier includes a tracking area code (TAC) or an access network area code (RANAC).

According to a seventh aspect, a communication apparatus is provided. The apparatus includes: a centralized unit (CU), configured to receive first information sent by a first apparatus, where the first information is used to indicate N moments and location information of the first apparatus at the N moments, where the CU is further configured to obtain second information, where the second information is used to indicate a correspondence between the N moments and M area identifiers, or the second information is used to indicate a correspondence between N locations and M area identifiers, and N and M are positive integers; and the CU is further configured to send the second information to the first apparatus.

With reference to the seventh aspect, in a possible implementation, the first information includes the N moments and N groups of latitude and longitude information of the first apparatus at the N moments; and the second information includes the correspondence between the N moments and the M area identifiers, or the second information includes a correspondence between N pieces of latitude and longitude information and the M area identifiers.

With reference to the seventh aspect, in a possible implementation, the first information includes the N moments and N groups of latitude and longitude information of the first apparatus at the N moments, each of the N groups of latitude and longitude information includes latitude and longitude information of at least one cell, and the at least one cell is at least one cell covered by the first apparatus; and the second information includes a correspondence between the N moments and M groups of area identifiers, or the second information includes a correspondence between the N groups of latitude and longitude information and M groups of area identifiers.

With reference to the seventh aspect, in a possible implementation, the first information is included in an F1 interface setup message or a first configuration update message; and the second information is included in an F1 interface setup response message or a first configuration update response message.

With reference to the seventh aspect, in a possible implementation, the area identifier includes a tracking area code (TAC) or an access network area code (RANAC).

With reference to the seventh aspect, in a possible implementation, the CU is further specifically configured to: generate the second information; or send the first information to a first core network device, and receive the second information sent by the first core network device.

With reference to the seventh aspect, in a possible implementation, the CU is further configured to: send the second information to at least one third apparatus.

With reference to the seventh aspect, in a possible implementation, the second information is included in an Xn interface setup request message.

According to an eighth aspect, a communication apparatus is provided. The apparatus includes: a receiving unit, configured to receive first information sent by a second apparatus, where the second apparatus includes a centralized unit (CU), and the first information is used to indicate N moments and location information of a first apparatus at the N moments; a processing unit, configured to generate second information based on the first information, where the second information is used to indicate a correspondence between the N moments and M area identifiers, or the second information is used to indicate a correspondence between N locations and M area identifiers, and N and M are positive integers; and a sending unit, configured to send the second information to the second apparatus.

With reference to the eighth aspect, in a possible implementation, the first information includes the N moments and N groups of latitude and longitude information of the first apparatus at the N moments; and the second information includes the correspondence between the N moments and the M area identifiers, or the second information includes a correspondence between N pieces of latitude and longitude information and the M area identifiers.

With reference to the eighth aspect, in a possible implementation, the first information includes the N moments and N groups of latitude and longitude information of the first apparatus at the N moments, each of the N groups of latitude and longitude information includes latitude and longitude information of at least one cell, and the at least one cell is at least one cell covered by the first apparatus; and the second information includes a correspondence between the N moments and M groups of area identifiers, or the second information includes a correspondence between the N groups of latitude and longitude information and M area identifiers.

With reference to the eighth aspect, in a possible implementation, the receiving unit is further configured to: receive third information sent by a fourth apparatus, where the third information is used to indicate N moments and location information of the fourth apparatus at the N moments; the processing unit is further configured to generate fourth information based on the third information, where the fourth information is used to indicate a correspondence between the N moments and M area identifiers, or the fourth information is used to indicate a correspondence between N locations and M area identifiers; the sending unit is further configured to send the fourth information to the fourth apparatus; the processing unit is further configured to determine a fifth apparatus corresponding to a first area identifier at a first moment based on the second information and the fourth information, where the first area identifier is an area identifier in an area identifier list of a to-be-paged terminal apparatus, and the fifth apparatus is one of the first apparatus and the fourth apparatus; and the sending unit is further configured to send a first paging message to the fifth apparatus.

With reference to the eighth aspect, in a possible implementation, the third information includes the N moments and N groups of latitude and longitude information of the fourth apparatus at the N moments; and the fourth information includes the correspondence between the N moments and the M area identifiers, or the fourth information includes a correspondence between N pieces of latitude and longitude information and the M area identifiers.

With reference to the eighth aspect, in a possible implementation, the third information includes the N moments and N groups of latitude and longitude information of the fourth apparatus at the N moments, each of the N groups of latitude and longitude information includes latitude and longitude information of at least one cell, and the at least one cell is at least one cell covered by the fourth apparatus; and the fourth information includes a correspondence between the N moments and M groups of area identifiers, or the fourth information includes a correspondence between the N groups of latitude and longitude information and M area identifiers.

With reference to the eighth aspect, in a possible implementation, the area identifier includes a tracking area code (TAC) or an access network area code (RANAC).

With reference to the eighth aspect, in a possible implementation, the first information is included in an NG interface setup message or an Xn interface setup request message, and the second information is included in an NG interface setup response message or an Xn interface setup request message.

With reference to the eighth aspect, in a possible implementation, the third information is included in an NG interface setup message or an Xn interface setup request message, and the fourth information is included in an NG interface setup response message or an Xn interface setup request message.

According to a ninth aspect, a communication apparatus is provided. The apparatus includes a first distributed unit (DU) and a first centralized unit (CU), where the first CU is configured to receive first information sent by the first DU, where the first information is used to indicate N moments and location information of the first DU at the N moments; the first CU obtains second information, where the second information is used to indicate a correspondence between the N moments and M area identifiers, or the second information is used to indicate a correspondence between N locations and M area identifiers, and N and M are positive integers; and the first CU is further configured to send the second information to the first DU.

The communication apparatus includes the first CU and the first DU. The first DU sends the location information of the first DU at the N moments to the first CU. The first CU obtains area identifiers corresponding to the first DU at the N moments, or the first CU obtains area identifiers corresponding to the location information of the first DU at the N moments, so that the first CU may send, to the first DU, the area identifiers corresponding to the first DU at the N moments or the area identifiers corresponding to the location information of the first DU at the N moments. In this way, the first CU and the first DU can exchange in time an area covered by the first DU. Therefore, the first DU obtains in time the area covered by the first DU, and storage load of the first DU is reduced.

With reference to the ninth aspect, in a possible implementation, the first information includes the N moments and N groups of latitude and longitude information of the first DU at the N moments; and the second information includes the correspondence between the N moments and the M area identifiers, or the second information includes a correspondence between N pieces of latitude and longitude information and the M area identifiers.

The first DU sends latitude and longitude information of the first DU at the N moments to the first CU, to obtain the area identifiers corresponding to the first DU at the N moments or area identifiers corresponding to the latitude and longitude information of the first DU at the N moments, so that the first DU and the first CU can exchange in time the area covered by the first DU. Therefore, the first DU obtains in time the area covered by the first DU, and the storage load of the first DU is reduced.

With reference to the ninth aspect, in a possible implementation, the first information includes the N moments and N groups of latitude and longitude information of the first DU at the N moments, each of the N groups of latitude and longitude information includes latitude and longitude information of at least one cell, and the at least one cell is at least one cell covered by the first DU; and the second information includes a correspondence between the N moments and M groups of area identifiers, or the second information includes a correspondence between the N groups of latitude and longitude information and M groups of area identifiers.

The first DU sends latitude and longitude information, at the N moments, of each cell covered by the first DU to the first CU, to obtain area identifiers, at the N moments, corresponding to each cell covered by the first DU or area identifiers corresponding to the latitude and longitude information, at the N moments, of each cell covered by the first DU, so that the first DU and the first CU can accurately exchange in time the area covered by the first DU. Therefore, the first DU obtains in time the area covered by the first DU, and the storage load of the first DU is reduced.

With reference to the ninth aspect, in a possible implementation, the first information is included in an F1 interface setup message or a first configuration update message; and the second information is included in an F1 interface setup response message or a first configuration update response message.

With reference to the ninth aspect, in a possible implementation, the area identifier includes a tracking area code (TAC) or an access network area code (RANAC).

With reference to the ninth aspect, in a possible implementation, the first CU is further specifically configured to: generate the second information; or send the first information to a first core network device, and receive the second information sent by the first core network device.

With reference to the ninth aspect, in a possible implementation, the first CU is further configured to: send the second information to at least one third apparatus.

With reference to the ninth aspect, in a possible implementation, the second information is included in an Xn interface setup request message.

According to a tenth aspect, a communication apparatus is provided. The apparatus includes: a receiving unit, configured to receive first information sent by a first distributed unit (DU), where the first information is used to indicate N moments and location information of the first DU at the N moments; a processing unit, configured to generate second information based on the first information, where the second information is used to indicate a correspondence between the N moments and M area identifiers, or the second information is used to indicate a correspondence between N locations and M area identifiers, and N and M are positive integers; and a sending unit, configured to send the second information to the first DU.

With reference to the tenth aspect, in a possible implementation, the first information includes the N moments and N groups of latitude and longitude information of the first DU at the N moments; and the second information includes the correspondence between the N moments and the M area identifiers, or the second information includes a correspondence between N pieces of latitude and longitude information and the M area identifiers.

With reference to the tenth aspect, in a possible implementation, the first information includes the N moments and N groups of latitude and longitude information of the first DU at the N moments, each of the N groups of latitude and longitude information includes latitude and longitude information of at least one cell, and the at least one cell is at least one cell covered by the first DU; and the second information includes a correspondence between the N moments and M groups of area identifiers, or the second information includes a correspondence between the N groups of latitude and longitude information and M area identifiers.

With reference to the tenth aspect, in a possible implementation, the receiving unit is further configured to: receive third information sent by a second CU, where the third information is used to indicate N moments and location information of a second DU at the N moments; the processing unit is further configured to generate fourth information based on the third information, where the fourth information is used to indicate a correspondence between the N moments and M area identifiers, or the fourth information is used to indicate a correspondence between N locations and M area identifiers; the sending unit is further configured to send the fourth information to the second CU; the processing unit is further configured to determine a third CU corresponding to a first area identifier at a first moment based on the second information and the fourth information, where the first area identifier is an area identifier in an area identifier list of a to-be-paged terminal apparatus, and the third CU is one of the first CU and the second CU; and the sending unit is further configured to send a first paging message to the third CU.

A first core network device receives location information of each of a plurality of DUs at each moment, to obtain an identifier of an area covered by each of the plurality of DUs at each location, so that the plurality of DUs and the first core network device exchange in time the area covered by each device, and the first core network device can determine an area in which the to-be-paged terminal device is located at the first moment and send a paging message to a corresponding CU. Therefore, the first core network device can effectively page the terminal device, and efficiency of paging the terminal device by the first core network device is improved.

With reference to the tenth aspect, in a possible implementation, the third information includes the N moments and N groups of latitude and longitude information of a third DU at the N moments; and the fourth information includes the correspondence between the N moments and the M area identifiers, or the fourth information includes a correspondence between N pieces of latitude and longitude information and the M area identifiers.

With reference to the tenth aspect, in a possible implementation, the third information includes the N moments and N groups of latitude and longitude information of a third DU at the N moments, each of the N groups of latitude and longitude information includes latitude and longitude information of at least one cell, and the at least one cell is at least one cell covered by the third DU; and the fourth information includes a correspondence between the N moments and M groups of area identifiers, or the fourth information includes a correspondence between the N groups of latitude and longitude information and M area identifiers.

With reference to the tenth aspect, in a possible implementation, the area identifier includes a tracking area code (TAC) or an access network area code (RANAC).

With reference to the tenth aspect, in a possible implementation, the first information is included in an NG interface setup message or an Xn interface setup request message, and the second information is included in an NG interface setup response message or an Xn interface setup request message.

With reference to the tenth aspect, in a possible implementation, the third information is included in an NG interface setup message or an Xn interface setup request message, and the fourth information is included in an NG interface setup response message or an Xn interface setup request message.

According to an eleventh aspect, this application provides an access network device, including a processor and a memory. The memory is configured to store a computer program, and the processor is configured to invoke and run the computer program stored in the memory, so that the access network device is enabled to perform the method according to any one of the first aspect or the possible implementations of the first aspect.

According to a twelfth aspect, this application provides a core network device, including a processor and a memory. The memory is configured to store a computer program, and the processor is configured to invoke and run the computer program stored in the memory, so that the core network device is enabled to perform the method according to any one of the second aspect or the possible implementations of the second aspect.

According to a thirteenth aspect, this application provides a computer-readable storage medium. The computer-readable storage medium stores computer instructions. When the computer instructions are run on a computer, the computer is enabled to perform the method according to any one of the first aspect or the possible implementations of the first aspect.

According to a fourteenth aspect, this application provides a computer-readable storage medium. The computer-readable storage medium stores computer instructions. When the computer instructions are run on a computer, the computer is enabled to perform the method according to any one of the second aspect or the possible implementations of the second aspect.

According to a fifteenth aspect, this application provides a chip, including a processor. The processor is configured to read and execute a computer program stored in a memory, to perform the method according to any one of the first aspect or the possible implementations of the first aspect.

Optionally, the chip further includes the memory, and the processor is connected to the memory through a circuit or a wire.

Further, optionally, the chip further includes a communication interface.

According to a sixteenth aspect, this application provides a chip, including a processor. The processor is configured to read and execute a computer program stored in a memory, to perform the method according to any one of the second aspect or the possible implementations of the second aspect.

Optionally, the chip further includes the memory, and the processor is connected to the memory through a circuit or a wire.

Further, optionally, the chip further includes a communication interface.

According to a seventeenth aspect, this application provides a computer program product. The computer program product includes computer program code. When the computer program code is run on a computer, the computer is enabled to perform the method according to any one of the first aspect or the possible implementations of the first aspect.

According to an eighteenth aspect, this application provides a computer program product. The computer program product includes computer program code. When the computer program code is run on a computer, the computer is enabled to perform the method according to any one of the second aspect or the possible implementations of the second aspect.

BRIEF DESCRIPTION OF DRAWINGS

FIG. 4(a) and FIG. 4(b) are a schematic diagram of TACs of TAs covered by a LEO device in a LEO movement process;

FIG. 5 is a schematic diagram of an architecture of a communication system applicable to an embodiment of this application;

FIG. 6 is a schematic diagram of another architecture of a communication system applicable to an embodiment of this application;

DETAILED DESCRIPTION OF EMBODIMENTS

The following describes technical solutions of this application with reference to the accompanying drawings.

The technical solutions of embodiments of this application may be applied to various communication systems such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

Figure 1:
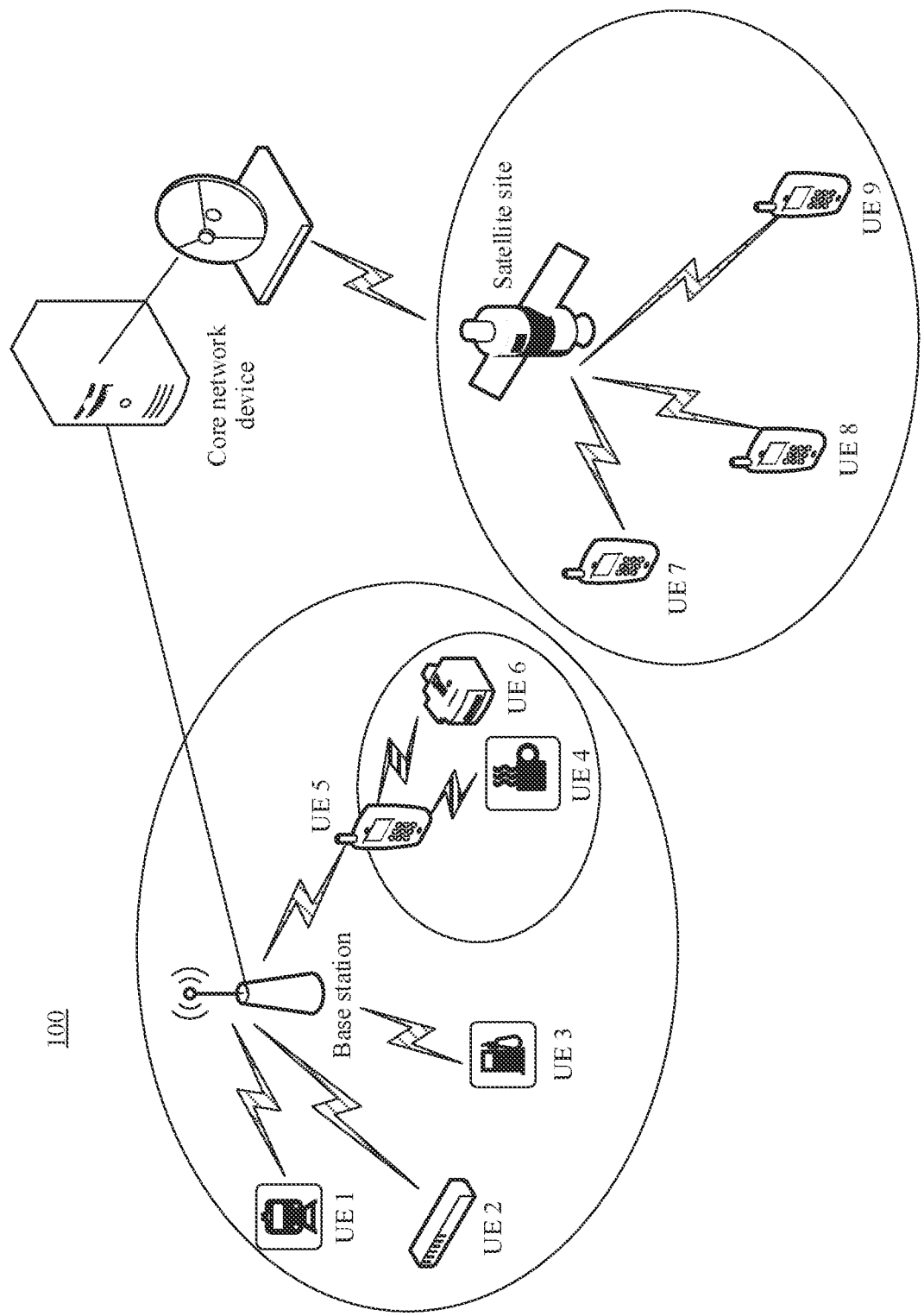
FIG. 1 is a schematic diagram of an example of a communication system applicable to embodiments of this application.

For ease of understanding of embodiments of this application, a communication system applicable to a method according to embodiments of this application is first described in detail with reference to FIG. 1. FIG. 1 is a schematic diagram of a communication system 100 applicable to the method according to embodiments of this application. As shown in the figure, the communication system 100 may include at least one access network device, for example, a base station (gNB) and a satellite site in a 5G system shown in FIG. 1. The communication system 100 may further include at least one terminal device, for example, user equipment (UE) 1 to UE 9 shown in FIG. 1. An access network device may communicate with each terminal device over a radio link. For example, the access network device may send configuration information to the terminal device, and the terminal device may send uplink data, to the access network device based on the configuration information. For another example, the access network device may send downlink data to the terminal device.

Therefore, the gNB and the UE 1 to the UE 6 in FIG. 1 may constitute a communication system, and the satellite site and the UE 7 to the UE 9 in FIG. 1 may also constitute a communication system. In addition, the base station and the satellite site are connected to a core network device in different manners, and the base station and the satellite site each may perform data sending with the core network device. In this architecture, there may be a plurality of satellite sites or base stations, and the satellite site may also serve UE similar to the UE 1 to the UE 6. This is not limited in this application. A plurality of antennas may be configured for each communication device, for example, the base station, the satellite site, or the UE 1 to the UE 9. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the base station may communicate with the UE 11 to the UE 6 by using a multi-antenna technology, and the satellite site may communicate with the UE 7 to the UE 9 by using the multi-antenna technology.

Terminal devices in the communication system 100, for example, the UE 4 to the UE 6, may also constitute a communication system. For example, the UE 5 may control the UE 4 and the UE 6 to execute corresponding instructions. This is not limited in this application.

It should be further understood that FIG. 1 is merely a simplified schematic diagram used as an example for ease of understanding. The communication system 100 may further include another access network device or another terminal device that is not shown in FIG. 1.

It should be understood that the access network device in the wireless communication system may be any device that has a wireless transceiver function. The device includes but is not limited to an evolved NodeB (eNB or eNodeB), a radio network controller (RNC), a NodeB (NB), a base station controller (BSC), a base transceiver station (BTS), home base station (for example, a home evolved NodeB, or a home NodeB, 1-INB), a baseband unit (BBU), an access point (AP) in a wireless fidelity (Wi-Fi) system, a wireless relay node, a wireless backhaul node, a transmission point (TP), a transmission reception point (transmission and reception point, TRP), and the like. Alternatively, the device may be a gNB or a transmission point (TRP or TP) in a 5G system, for example, an NR system, may be one antenna panel or a group of antenna panels (including a plurality of antenna panels) of a base station in a 5G system, or may be a network node, for example, a baseband unit (BBU) or a distributed unit (DU), that constitute a gNB or a transmission point.

In some deployments, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the MY layer, or is converted from information at the PHY layer. Therefore, in this architecture, higher layer signaling such as RRC layer signaling may also be considered as being sent by the DU or sent by the DU and the CU. It may be understood that the access network device may be a CU node, a DU node, or a device including a CU node and a DU node. In addition, the CU may be classified as an access network device in an access network (radio access network, RAN), or the CU may be classified as an access network device in a core network (CN). This is not limited in this application.

It should be further understood that the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application.

In embodiments of this application, the terminal device or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing through a process, for example, a. Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the access network device, or a function module that can invoke and execute the program and that is in the terminal device or the access network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

To facilitate understanding of embodiments of this application, related technical content in this application is briefly described first.

1. NTN

The NTN is a communication scenario in a 5G system. Because a conventional terrestrial network cannot provide seamless coverage for a terminal device, especially in a place in which a base station cannot be deployed, for example, a sea, a desert, or the air, the non-terrestrial network is introduced into the 5G system. In the NTN, a base station or a part of base station functions are deployed on a high-altitude platform or a satellite to provide seamless coverage for the terminal device, and the high-altitude platform or the satellite is little affected by a natural disaster, so that reliability of the 5G system can be improved.

In the NTN, a terminal device having a long antenna may be in a communication connection with a base station deployed on a high-altitude platform or a satellite. The high-altitude platform may be a hot air balloon, an airplane, or another flight vehicle. The satellite may be a LEO satellite, a medium earth orbit (MEO) satellite, a geostationary earth orbit (GEO) satellite, or the like.

2. Public Land Mobile Network (PLMN)

The PLMN is a network established and operated by a government or an operator authorized by the government, to provide land mobile communication services for the public. The HAIN is usually interconnected with a public switched telephone network (PSTN) to form a regional or national-scale communication network. The PLMN is a wireless communication system mainly for a mobile user on the land, for example, in a vehicle or on foot.

3. Radio Resource Control (RRC) States

Figure 2:
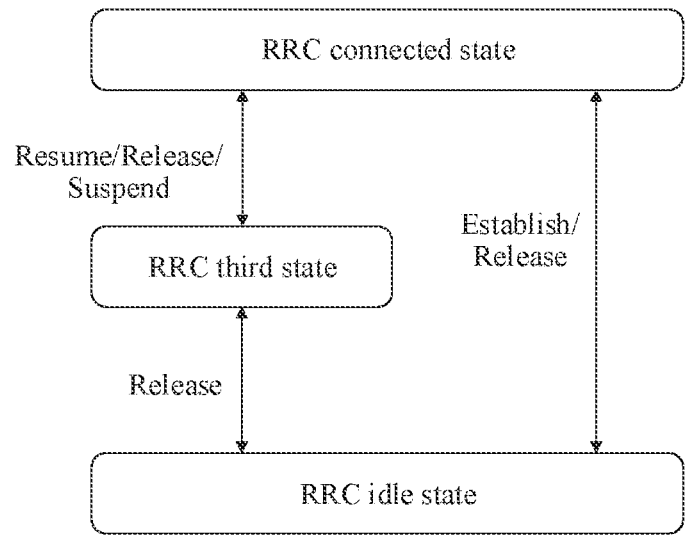
FIG. 2 is a schematic diagram of a transition relationship among three RRC states.

In a 5G system, RRC states of a terminal device include an RRC connected (RRC_CONNECTED) state, an RRC inactive (RRC_INACTIVE) state or an RRC third state, and an RRC (RRC_IDLE) state. FIG. 2 is a schematic diagram of a transition relationship among the three RRC states.

When the terminal device is in the RRC connected state, the terminal device has established links to both a base station and a core network. When data arrives at a network, the data may be directly delivered to the terminal device. When the terminal device is in the RRC third state (or the RRC inactive state), it indicates that the terminal device previously established links to both the base station and the core network, but a link between the terminal device and the base station is released (that is, the terminal device switches from the RRC connected state to the RRC third state). Although the link is released, the base station stores a context of the terminal device. When there is data needing to be transmitted, the base station may quickly resume the link between the terminal device and the base station (that is, the terminal device switches from the RRC third state to the RRC connected state). When the terminal device is in the RRC idle state, there is no link between the terminal device and the base station or between the terminal device and the core network. When there is data needing to be transmitted, links between the terminal device and the base station and between the terminal device and the core network need to be established (that is, the terminal device switches from the RRC idle state to the RRC connected state).

4. Tracking Area (TA)

The tracking area is a concept introduced in an LTE/NR system for location management of a terminal device. The tracking area is defined as a free movement area in which a service does not need to be updated for the terminal device. The TA is used for terminal location management, and the terminal location management may be classified into paging management and location update management. The terminal device notifies a core network of the TA of the terminal device through tracking area registration.

When the terminal device is in an RRC idle state, the core network can learn of the tracking area of the terminal device. In addition, when the terminal device in the RRC idle state needs to be paged, paging may be performed in all cells in the tracking area registered by the terminal device.

The TA is configured at a cell level. A plurality of cells may be configured with a same TA, and one cell belongs to only one TA.

A tracking area identity (TAI) includes a PLMN and a tracking area code (TAC), that is, TAI=PLMN+TAC.

Figure 3:
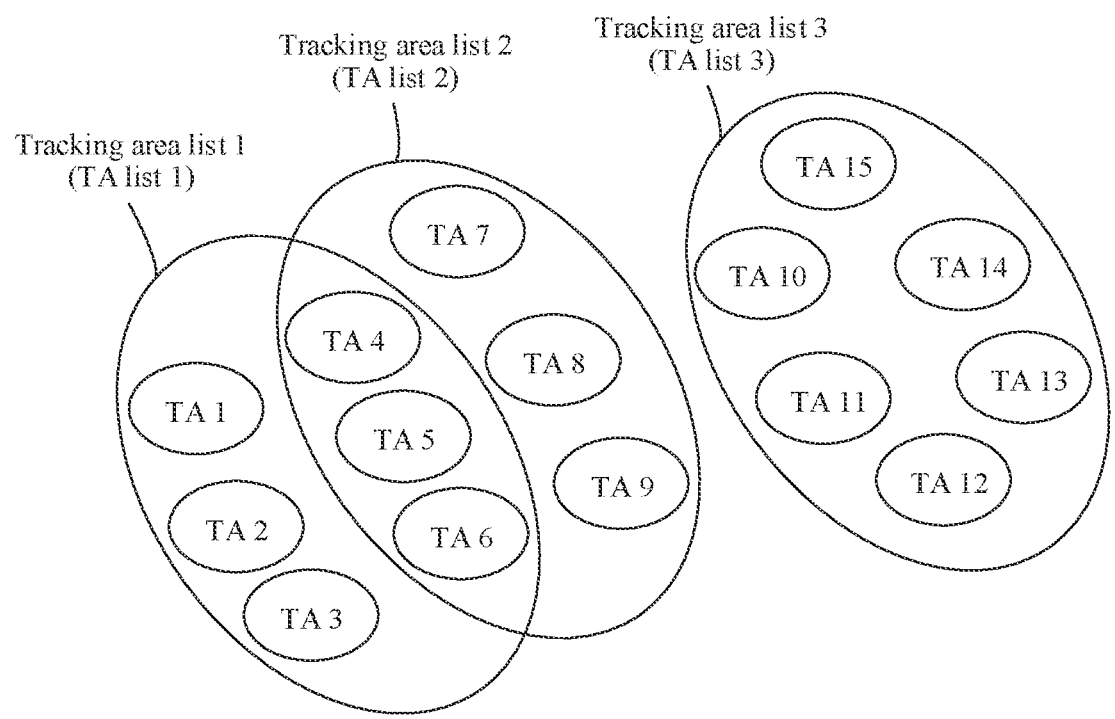
FIG. 3 is a schematic diagram of three TA lists.

A TA list includes a plurality of TAs, and the plurality of TAs are allocated to one UE. When moving within the TA list, the UE does not need to perform TA update (TAU), to reduce frequent interactions with a network. For example, as shown in FIG. 3, a TA list 1 includes a TA 1, a TA 2, a TA 3, a TA 4, a TA 5, and a TA 6; a TA list 2 includes the TA 4, the TA 5, the TA 6, a TA 7, a TA 8, and a TA 9; a TA list 3 includes a TA 10, a TA 11, a TA 12, a TA 13, a TA 14, and a TA 15. The TA list 1 may be allocated to a terminal device 1, and when the terminal device 1 moves in the TA (the TA 1, the TA 2, the TA 3, the TA 4, the TA 5, or the TA 6) in the TA list 1, the terminal device 1 does not need to perform TAU. The TA list 2 may be allocated to a terminal device 2, and when the terminal device 2 moves in the TA (the TA 4, the TA 5, the TA 6, the TA 7, the TA 8, or the TA 9) in the TA list 2, the terminal device 2 does not need to perform TAU. The TA list 3 may be allocated to a terminal device 3, and when the terminal device 3 moves in the TA (the TA 10, the TA 11, the TA 12, the TA 13, the TA 14, or the TA 15) in the TA list 3, the terminal device 3 does not need to perform TAU.

When entering a TA that is not in the TA list registered by the terminal device, the terminal device needs to perform TAU. The core network reallocates a group of TAs to the terminal device, and the newly allocated TAs may also include some TAs in the original TA list. As shown in FIG. 3, for example, when the terminal device 1 moves to the TA 9, the terminal device 1 enters a TA that is not in the TA list 1 registered by the terminal device 1. In this case, the terminal device 1 needs to perform TAU to add the TA 9 to the TA list 1. For another example, when the terminal device 2 moves to the TA 11, the terminal device 2 enters a TA that is not in the TA list 2 registered by the terminal device 2. In this case, the terminal device 2 needs to perform TAU to add the TA 11 to the TA list 1. In addition, the terminal device further periodically performs TAU to enable the core network to learn of a location of the terminal device.

5. RAN-Based Notification Area (RNA)

A concept of RNA is similar to a concept of TA, but the RNA is specific to a terminal device in an RRC third state (or an RRC inactive state). There are two options for composition of the RNA:

A. a list of cells; and

B. a list of RAN areas, where each RAN area includes all or a part of TAs.

The last base station serving the terminal device before the terminal device enters the RRC third state configures the RNA for the terminal device. When the terminal device moves within the RNA, RNA update (RNAU) does not need to be performed. If the terminal device enters a TA that is not in the RNA configured for the terminal device by the last base station serving the terminal device before the terminal device enters the RRC third state, the terminal device initiates RNAU. In addition, the terminal device also periodically performs TAU, so that the last base station serving the terminal device before the terminal device enters the RRC third state learns of a location of the terminal device.

6. Paging

When a terminal device is in an RRC idle state, no link is established between the terminal device and a base station. Alternatively, when the terminal device is in an RRC third state, a link established between the terminal device and the base station is released by the base station. In this case, if a network side needs to send data or a voice to the terminal device, the network side finds the terminal device by using a paging message. After receiving the paging message, the terminal device establishes a link to the base station, to perform data or voice transmission.

Specifically, paging is classified into two types:

(1) Paging initiated by a CN (CN Paging) is specific to a terminal device in the RRC idle state and a terminal device in a connection management idle (Connection Manager IDLE, CM_IDLE) state, and a paging message is based on a TA. This paging manner is initiated by an access and mobility management function (AMF) of the 5G core network. The AMF sends the paging message to all base stations included in a TAI list of the terminal device, and then the base stations transparently transmit the paging message to all terminal devices connected to cells related to the base stations. A terminal device that detects the paging message checks whether the paging message includes an identifier (Identity, ID) of the terminal device. If the paging message includes the ID of the terminal device, the terminal device initiates an RRC setup request to the base station, to be connected to the network. If the paging message does not include the ID of the terminal device, the terminal device ignores the paging request.

In a CU-DU architecture, a CU determines cells included in the TAI list in the paging message and DUs to which the cells belong, and then sends a cell list related to the paging message to the related DUs, so that the DU generates a paging message, and sends the paging message to all terminal devices connected to the cell related to the DU.

(2) Paging initiated on a RAN side (RAN Paging) is specific to a terminal device in the RRC third state and a terminal device in a connection management connected (Connection Manager CONNECTED, CM_CONNECTED) state, and a paging message is based on an RNA. This paging manner is initiated by the last base station serving the terminal device before the terminal device enters the RRC third state from an RRC connected state. When the terminal device enters the RRC third state, an AMF side cannot perceive that the terminal device enters the RRC third state. In this case, the AMF considers that the terminal device is still in the RRC connected state, and the AMF continues to send data to the last serving base station. However, a link between the last serving base station and the terminal device has been released, so that the last serving base station cannot find the terminal device. However, the last serving base station configures the RNA for the terminal device and sends the paging message to all base stations in a RANAC list of the terminal device, and then the base stations transparently transmit the paging message to all terminal devices connected to cells related to the base stations. A terminal device that detects the paging message checks whether the paging message includes an identifier (Identity, ID) of the terminal device. If the paging message includes the ID of the terminal device, the terminal device initiates an RRC setup request to the base station, to be connected to the network. If the paging message does not include the ID of the terminal device, the terminal device ignores the paging request.

In a CU-DU architecture, a CU determines cells included in a RAN paging area in the paging message and DUs to which the cells belong, and then sends a cell list related to the paging message to the related DUs, so that the DU generates a paging message, and sends the paging message to all terminal devices connected to the cell related to the DU.

7. Satellite Communication

A higher orbit of a satellite indicates a larger area of the satellite and a higher communication delay. Generally, orbits of satellites may be classified based on heights into the following types:

(1) LEO: with an orbit height of 160 to 2000 km;
(2) medium earth orbit (MEO): with an orbit height of 2000 to 35786 km; and
(3) geostationary earth orbit (GEO): with an orbit height of 35786 km, where a location, relative to the earth, of a satellite revolving in this orbit is not affected by rotation of the earth.

A low earth orbit communication satellite is close to the ground, and has a low communication delay and a high data transmission rate.

A location of an access network device in a conventional terrestrial network is fixed. When an NG interface connection is established between the access network device and a core network device, the access network device sends a TAC or a RANAC supported by the access network device to the core network device. Because the location of the access network device is fixed, planning of a TAC or a RANAC supported by each access network device remains unchanged, and a TAC or a RANAC of each cell within coverage of each access network device remains unchanged.

A LEO access network device in an NTN continuously moves relative to the ground. Currently, a geographical location is bound to a TA. To be specific, when the LEO access network device moves, a TA of the LEO access network device continuously changes, but a TA of a terminal device remains unchanged. For example, FIG. 4(a) and FIG. 4(b) are a schematic diagram of a TAC change of a LEO access network device in a movement process of the LEO access network device. The access network device needs to transmit data with a terminal device 1, and the terminal device 1 is in a TA indicated by a TAC 1. As shown in FIG. 4(a), at a moment $t_0$, a coverage area, on the ground, of a beam sent by an antenna of an access network device 1 is a TA indicated by a TAC 0, and a coverage area, on the ground, of a beam sent by an antenna of an access network device 2 is the TA indicated by the TAC 1. In this case, the terminal device 1 is in the coverage area, on the ground, that is of the access network device 2 and that is indicated by the TAC 1. As the access network device 1 and the access network device 2 move, the coverage area, on the ground, of the beam sent by the antenna of the access network device 1 and the coverage area, on the ground, of the beam sent by the antenna of the access network device 2 change. As shown in FIG. 4(b), at a moment $t_1$, a coverage area, on the ground, of the beam sent by the antenna of the access network device 1 is the TA indicated by the TAC 1, and a coverage area, on the ground, of the beam sent by the antenna of the access network device 2 is a TA indicated by a TAC 2, where the moment $t_1$ is different from the moment $t_0$. In this case, the terminal device 1 is in the coverage area, on the ground, that is of the access network device 1 and that is indicated by the TAC 1. However, a core network device or another access network device cannot learn in time of an access network device to which the coverage area, on the ground, in which the to-be-paged terminal device 1 is located belongs. Consequently, the to-be-paged terminal device 1 cannot be paged.

Therefore, as the access network device continuously moves, the terminal device to be paged by the access network device may not be within a coverage area, on the around, of a beam sent by an antenna of the access network device. Consequently, a core network device or another access network device cannot learn in time of an access network device to which the coverage area, on the ground, in which the to-be-paged terminal device is located belongs.

Therefore, this application provides a communication method, so that an access network device and a core network device can quickly and efficiently exchange a coverage area of the access network device on the ground, For ease of understanding of embodiments of this application, the following descriptions are first provided before embodiments of this application are described.

First, in embodiments of this application, an "indication" may include a direct indication and an indirect indication, or may include an explicit indication and an implicit indication. Information indicated by specific information (for example, the following first information) is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or agreed on in advance. For example, specific information may alternatively be indicated by using an arrangement sequence of all information that is agreed on in advance (for example, stipulated in a protocol), to reduce indication overheads to some extent.

Second, the terms "first", "second", and various numbers in the following embodiments are merely used for differentiation for ease of description, and are not used to limit the scope of embodiments of this application. For example, the terms are used to distinguish between different indication information.

Third, "a plurality of" in embodiments of this application means two or more.

Fourth, the term "core network device" in embodiments of this application may be an access and mobility management function (AMF), but is not limited to the AMF.

Fifth, the term "access network device" in embodiments of this application may be a gNB.

The following describes a communication method provided in embodiments of this application with reference to the accompanying drawings. An access network device in embodiments may be the satellite site in FIG. 1, and a terminal device may be the UE 7, the UE 8, or the UE 9 in FIG. 1.

The following uses different architectures of communication systems to separately describe in detail the communication method provided in embodiments of this application, FIG. 5 is a schematic diagram of an architecture of a communication system applicable to an embodiment of this application. As shown in FIG. 5, a satellite carries payloads having functions of an entire access network device. A terminal device is connected to the access network device through a wireless Uu interface, and the access network device establishes a wireless feedback link to a CN through a terrestrial NTN gateway.

In new radio (NR), the Uu interface is also referred to as NR-Uu. In addition, an N6 interface shown in FIG. 5 is an interface between the CN and a data network. An NG interface is used between the CN and the NTN gateway. A satellite radio interface (SRI)-based NG interface is used between the NTN gateway and a radio access network (RAN).

FIG. 6 is a schematic diagram of another architecture of a communication system applicable to an embodiment of this application. As shown in FIG. 6, a satellite carries payloads having a part of functions of an access network device. For example, the satellite may carry a DU, and the DU in the air establishes a wireless feedback link to a CU through a terrestrial NTN gateway.

Figure 7:
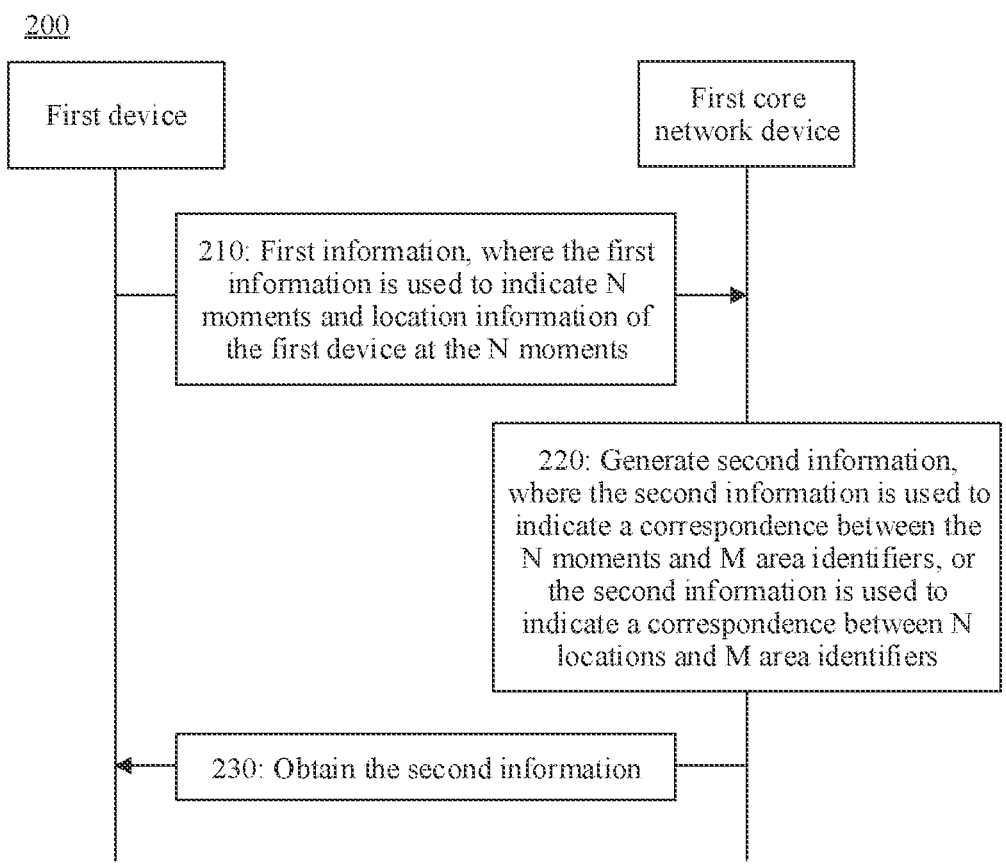
FIG. 7 is a schematic flowchart of a communication method 200 according to an embodiment of this application.

In addition, in FIG. 6, an SRI-based F1 interface is used between the DU and the CU of the access network device, where an RRU represents a radio remote unit FIG. 7 is a schematic flowchart of a communication method 200 according to this application. With reference to FIG. 7, the following describes the communication method 200 provided in an embodiment of this application. The method 200 includes step 210 to step 230. A first device in the method 200 may be the satellite in FIG. 5, and the first device carries payloads having functions of an entire access network device.

In the following descriptions, a third device in the method 200 may also be the satellite in FIG. 5, and the third device carries payloads having functions of an entire access network device.

Step 210: The first device sends first information, where the first information is used to indicate N moments and location information of the first device at the N moments, and N is a positive integer.

The location information of the first device at the N moments may be understood as that each of the N moments corresponds to one piece of location information of the first device.

Pieces of location information of the first device that correspond to the N moments may be all different. Alternatively, the pieces of location information of the first device that correspond to the N moments may include same location information of the first device, that is, pieces of location information of the first device that correspond to the first device at n moments are the same, where n is an integer and n∈[0, N], For example, N is equal to 3, location information of the first device that corresponds to the first device at a moment a is location information a, location information of the first device that corresponds to the first device at a moment b is location information b, and location information of the first device that corresponds to the first device at a moment c is location information c, where the location information a, the location information b, and the location information c are all different. In this case, pieces of location information of the first device that correspond to the first device at zero moments are the same. To be specific, pieces of location information of the first device that correspond to the first device at the moment a, the moment b, and the moment c are all different. For another example, N is equal to 4, location information of the first device that corresponds to the first device at a moment 1 is location information 1, location information of the first device that corresponds to the first device at a moment 2 is the location information 1, location information of the first device that corresponds to the first device at a moment 3 is the location information 1, and location information of the first device that corresponds to the first device at a moment 4 is location information 2, where the location information 1 and the location information 2 are different. In this case, pieces of location information of the first device that correspond to the first device at three moments are the same. To be specific, pieces of location information of the first device that correspond to the first device at the moment the moment 2, and the moment 3 are all the location information 1.

Optionally, the first device may send the first information to a first core network device. Correspondingly, the first core network device receives the first information sent by the first device.

The first information is included in an NG interface setup message. That the first information is included in an NG interface setup message may be understood as follows: When the first device sets up an NG interface with the first core network device, the first device sends the NG interface setup message to the first core network device, where the NG interface setup message carries the first information.

The first information may include the N moments and latitude and longitude information corresponding to the first device at the N moments, as described in the following form 1. Alternatively, the first information may include the N moments and N groups of latitude and longitude information of the first device at the N moments, as described in the following form 2. Each of the N groups of latitude and longitude information includes latitude and longitude information of at least one cell, and the at least one cell is at least one cell covered by the first device.

The following separately describes in detail content included in the second information with reference to the form 1 and the form 2.

Form 1: The first information may include the N moments and the latitude and longitude information corresponding to the first device at the N moments.

For example, Table 1 shows a form of the first information, where N is 2. To be specific, the first information includes two moments and latitude and longitude information corresponding to the first device at the two moments. To be specific, a location of the first device at a moment 1 is indicated by latitude and longitude information 1, and a location of the first device at a moment 2 is indicated by latitude and longitude information 2. The latitude and longitude information 1 and the latitude and longitude information 2 may be the same, or the latitude and longitude information 1 and the latitude and longitude information 2 may be different.

TABLE 1

| Latitude and longitude information of the first device | Moment |
|---|---|
| Latitude and longitude information 1 | Moment 1 |
| Latitude and longitude information 2 | Moment 2 |

Form 2: The first information includes the N moments and the N groups of latitude and longitude information of the first device at the N moments. Each of the N groups of latitude and longitude information includes latitude and longitude information of at least one cell, and the at least one cell is at least one cell covered by the first device.

For example, Table 2 shows another form of the first information, where N is 2, and the first device covers three cells, which are separately a cell 1, a cell 2, and a cell 3. To be specific, the first information includes two moments and two groups of latitude and longitude information of the first device at the two moments, and each group of latitude and longitude information includes latitude and longitude information of the three cells. When the first device is at a moment 1, a location of the cell 1 is indicated by latitude and longitude information 1, a location of the cell 2 is indicated by latitude and longitude information 2, and a location of the cell 3 is indicated by latitude and longitude information 3. When the first device is at a moment 2, a location of the cell 1 is indicated by latitude and longitude information 1', a location of the cell 2 is indicated by latitude and longitude information 2', and a location of the cell 3 is indicated by latitude and longitude information 3'. The latitude and longitude information 1 and the latitude and longitude information 1l' may be the same, or the latitude and longitude information 1 and the latitude and longitude information 1' may be different. The latitude and longitude information 2 and the latitude and longitude information 2' may be the same, or the latitude and longitude information 2 and the latitude and longitude information 2' may be different. The latitude and longitude information 3 and the latitude and longitude information 3' may be the same, or the latitude and longitude information 3 and the latitude and longitude information 3' may be different.

TABLE 2

| Group number | Latitude and longitude information of each cell covered by the first device | Moment |
|---|---|---|
| Group 1 | Latitude and longitude information 1 of the cell 1<br>Latitude and longitude information 2 of the cell 2<br>Latitude and longitude information 3 of the cell 3 | Moment 1 |
| Group 2 | Latitude and longitude information 1' of the cell 1<br>Latitude and longitude information 2' of the cell 2<br>Latitude and longitude information 3' of the cell 3 | Moment 2 |

Step 220: The first core network device generates second information based on the first information, where the second information is used to indicate a correspondence between the N moments and M area identifiers, or the second information is used to indicate a correspondence between N locations and M area identifiers, and M is a positive integer.

An $m^{th}$ TA in the M area identifiers is an area covered by the first device at a moment or a location corresponding to an $m^{th}$ area identifier, where m is a positive integer and $m \in [1, M]$.

Optionally, the area identifier includes a TAC or a RANAC.

When the first information includes the N moments and the latitude and longitude information corresponding to the first device at the N moments, the second information includes the correspondence between the N moments and the M area identifiers, or the second information includes a correspondence between N pieces of latitude and longitude information and the M area identifiers, as described in the following form A.

When the first information includes the N moments and the N groups of latitude and longitude information of the first device at the N moments, the second information includes a correspondence between the N moments and M groups of area identifiers, or the second information includes a correspondence between the N groups of latitude and longitude information and M groups of area identifiers, as described in the following form B.

The following separately describes in detail content included in the second information with reference to the form A and the form B.

Form A: The second information includes the correspondence between the N moments and the M area identifiers.

Case 1: The area identifier includes the TAC.

For example, Table 3 shows a form of the second information, where N is 2, M is also 2, and the area identifier is the TAC. To be specific, the second information includes a correspondence between two moments and two TACs. To be specific, when the first device is at a moment 1, a TAC of a TA covered by the first device is a TAC 1; when the first device is at a moment 2, a TAC of a TA covered by the first device is a TAC 2. The TAC 1 and the TAC 2 may be the same, or the TAC 1 and the TAC 2 may be different.

TABLE 3

| Moment | TAC of a TA covered by the first device |
|---|---|
| Moment 1 | TAC 1 |
| Moment 2 | TAC 2 |

For example, Table 4 shows another form of the second information, where N is 2. M is 4, and the area identifier is the TAC. To be specific, the second information includes a correspondence between two moments and four TACs. To be specific, when the first device is at a moment 1, TACs of TAs covered by the first device are a TAC 1 and a TAC 3; when the first device is at a moment 2, TACs of TAs covered by the first device are a TAC 2 and a TAC 4. The TAC 1 and the TAC 2 may be the same, or the TAC 1 and the TAC 2 may be different. The TAC 1 and the TAC 4 may be the same, or the TAC 1 and the TAC 4 may be different. The TAC 3 and the TAC 2 may be the same, or the TAC 3 and the TAC 2 may be different. The TAC 3 and the TAC 4 may be the same, or the TAC 3 and the TAC 4 may be different.

TABLE 4

| Moment | TAC of a TA covered by the first device |
|---|---|
| Moment 1 | TAC 1 and TAC 3 |
| Moment 2 | TAC 2 and TAC 4 |

For example. Table 5 shows still another form of the second information, where N is 2, M is also 2, and the area identifier is the TAC. To be specific, the second information includes a correspondence between two pieces of latitude and longitude information and two TACs. To be specific, when the first device is at a location indicated by latitude and longitude information 1, a TAC of a TA covered by the first device is a TAC 1; when the first device is at a location indicated by latitude and longitude information 2, a TAC of a TA covered by the first device is a TAC 2. The TAC 1 and the TAC 2 may be the same, or the TAC 1 and the TAC 2 may be different.

TABLE 5

| Latitude and longitude information of the first device | TAC of a TA covered by the first device |
|---|---|
| Latitude and longitude information 1 | TAC 1 |
| Latitude and longitude information 2 | TAC 2 |

For example. Table 6 shows still another form of the second information, where N is 2, M is 4, and the area identifier is the TAC. To be specific, the second information includes a correspondence between two pieces of latitude and longitude information and four TACs. To be specific, when the first device is at a location indicated by latitude and longitude information 1, TACs of TAs covered by the first device are a TAC 1 and a TAC 3; when the first device is at a location indicated by latitude and longitude information 2, TACs of TAs covered by the first device are a TAC 2 and a TAC 4. The TAC 1 and the TAC 2 may be the same, or the IAC 1 and the TAC 2 may be different. The TAC 1 and the TAC 4 may be the same, or the TAC 1 and the TAC 4 may be different. The TAC 3 and the TAC 2 may be the same, or the TAC 3 and the TAC 2 may be different. The TAC 3 and the TAC 4 may be the same, or the TAC 3 and the TAC 4 may be different.

TABLE 6

| Latitude and longitude information of the first device | TAC of a TA covered by the first device |
|---|---|
| Latitude and longitude information 1 | TAC 1 and TAC 3 |
| Latitude and longitude information 2 | TAC 2 and TAC 4 |

Case 2: The area identifier includes the RANAC.

For example, Table 7 shows a form of the second information, where N is 2, M is also 2, and the area identifier is the RANAC. To be specific, the second information includes a correspondence between two moments and two RANACs. To be specific, when the first device is at a moment 1 a RANAC of a RAN area covered by the first device is a RANAC 1; when the first device is at a moment 2, a RANAC of a RAN area covered by the first device is a RANAC 2. The RANAC 1 and the RANAC 2 may be the same, or the RANAC 1 and the RANAC 2 may be different.

TABLE 7

| Moment | RANAC of a RAN area covered by the first device |
|---|---|
| Moment 1 | RANAC 1 |
| Moment 2 | RANAC 2 |

For example, Table 8 shows another form of the second information, where N is 2, M is 4, and the area identifier is the RANAC. To be specific, the second information includes correspondence between two moments and four RANACs. To be specific, when the first device is at a moment 1. RANACs of RAN areas covered by the first device are a RANAC and a RANAC 3; when the first device is at a moment 2, RANACs of RAN areas covered by the first device are a RANAC 2 and a RANAC 4. The RANAC 1 and the RANAC 2 may be the same, or the RANAC 1 and the RANAC 2 may be different. The RANAC 1 and the RANAC 4 may be the same, or the RANAC 1 and the RANAC 4 may be different. The RANAC 3 and the RANAC 2 may be the same, or the RANAC 3 and the RANAC 2 may be different. The RANAC 3 and the RANAC 4 may be the same, or the RANAC 3 and the RANAC 4 may be different.

TABLE 8

| Moment | RANAC of a RAN area covered by the first device |
|---|---|
| Moment 1 | RANAC 1 and RANAC 3 |
| Moment 2 | RANAC 2 and RANAC 4 |

For example, Table 9 shows still another form of the second information, where N is 2, M is 2, and the area identifier is the RANAC. To be specific, the second information includes a correspondence between two pieces of latitude and longitude information and two RANACs. To be specific, when the first device is at a location indicated by latitude and, longitude information 1, a RANAC of RAN areas covered by the first device are a RANAC 1; when the first device is at a location indicated by latitude and longitude information 2, a RANAC of RAN areas covered by the first device is a RANAC 2. The RANAC 1 and the RANAC 2 may be the same, or the RANAC 1 and the RANAC 2 may be different.

TABLE 9

| Latitude and longitude information of the first device | RANAC of a RAN area covered by the first device |
|---|---|
| Latitude and longitude information 1 | RANAC 1 |
| Latitude and longitude information 2 | RANAC 2 |

For example, Table 10 shows still another form of the second information, where N is 2, M is 4, and the area identifier is the RANAC. To be specific, the second information includes a correspondence between two pieces of latitude and longitude information and four RANACs. To be specific, when the first device is at a location indicated by latitude and, longitude information 1, RANACs of RAN areas covered by the first device are a RANAC 1 and a RANAC 3; when the first device is at a location indicated by latitude and longitude information 2, RANACs of RAN areas covered by the first device are a RANAC 2 and a RANAC 4. The RANAC 1 and the RANAC 2 may be the same, or the RANAC 1 and the RANAC 2 may be different. The RANAC 1 and the RANAC 4 may be the same, or the RANAC 1 and the RANAC 4 may be different. The RANAC 3 and the RANAC 2 may be the same, or the RANAC 3 and the RANAC 2 may be different. The RANAC 3 and the RANAC 4 may be the same, or the RANAC 3 and the RANAC 4 may be different.

TABLE 10

| Latitude and longitude information of the first device | RANAC of a RAN area covered by the first device |
|---|---|
| Latitude and longitude information 1 | RANAC 1 and RANAC 3 |
| Latitude and longitude information 2 | RANAC 2 and RANAC 4 |

Form B: The second information includes the correspondence between the N moments and the M groups of area identifiers, or the second information includes the correspondence between the N groups of latitude and longitude information and the M groups of area identifiers.

Case 1: The area identifier includes the TAC.

For example, Table 11 shows a form of the second information, where N is 2, M is 2, and the first device covers three cells, which are separately a cell 1, a cell 2, and a cell 3. To be specific, the second information includes a correspondence between two moments and two groups of TACs, where each group of TAs includes TACs of the three cells. When the first device is at a moment 1, a TAC of the cell 1 is a TAC 1, a TAC of the cell 2 is a TAC 2, and a TAC of the cell 3 is a TAC 3; when the first device is at a moment 2, a TA of the cell 1 is a TAC 1', a TA of the cell 2 is a TAC 2', and a TAC of the cell 3 is a TAC 3'. The TAC 1 and the TAC 1' may be the same, or the TAC 1 and the TAC 1' may be different. The TAC 2 and the TAC 2' may be the same, or the TAC 2 and the TAC 2' may be different. The TAC 3 and the TAC 3' may be the same, or the TAC 3 and the TAC 3' may be different.

TABLE 11

| Group number | Moment | TAC of each cell covered by the first device |
|---|---|---|
| Group 1 | Moment 1 | TAC 1 of the cell 1<br>TAC 2 of the cell 2<br>TAC 3 of the cell 3 |
| Group 2 | Moment 2 | TAC 1' of the cell 1<br>TAC 2' of the cell 2<br>TAC 3' of the cell 3 |

For example, Table 12 shows another form of the second information, where M is 2, N is 2, and the first device covers three cells, which are separately a cell 1, a cell 2, and a cell 3. To be specific, the second information includes a correspondence between two groups of latitude and longitude information and two groups of TACs, where each group of TACs includes TACs of the three cells. When the cell 1 covered by the first device is at a location indicated by latitude and longitude information 1, a TAC of the cell 1 is a TAC 1; when the cell 2 covered by the first device is at a location indicated by latitude and longitude information 2, a TAC of the cell 2 is a TAC 2, when the cell 3 covered by the first device is at a location indicated by latitude and longitude information 3, a TAC of the cell 3 is a TAC 3. When the cell 1 covered by the first device is at a location indicated by latitude and longitude information 1', a TAC of the cell 1 is a TAC 1'; when the cell 2 covered by the first device is at a location indicated by latitude and longitude information 2', a TAC of the cell 2 is a TAC 2'; when the cell 3 covered by the first device is at a location indicated by latitude and longitude information 3', a TAC of the cell 3 is a TAC 3'. The TAC 1 and the TAC 1' may be the same, or the TAC and the TAC 1' may be different. The TAC 2 and the TAC 2' may be the same, or the TAC 2 and the TAC 2' may be different. The TAC 3 and the TAC 3' may be the same, or the TAC 3 and the TAC 3' may be different.

TABLE 12

| Group number | Latitude and longitude information of each cell covered by the first device | TAC of each cell covered by the first device |
|---|---|---|
| Group 1 | Latitude and longitude information 1 of the cell 1 | TAC 1 of the cell 1 |
| | Latitude and longitude information 2 of the cell 2 | TAC 2 of the cell 2 |
| | Latitude and longitude information 3 of the cell 2 | TAC 3 of the cell 3 |
| Group 2 | Latitude and longitude information 1' of the cell 1 | TAC 1' of the cell 1 |
| | Latitude and longitude information 2' of the cell 2 | TAC 2' of the cell 2 |
| | Latitude and longitude information 3' of the cell 2 | TAC 3' of the cell 3 |

Case 2: The area identifier includes the RANAC.

For example, Table 13 shows a form of the second information, where M is 2, and the first device covers three cells, which are separately a cell 1, a cell 2, and a cell 3. To be specific, the second information includes a correspondence between two moments and two groups of RANACs, where each group of TAs includes RANACs of the three cells. When the first device is at a moment 1, a RANAC of the cell 1 is a RANAC 1, a RANAC of the cell 2 is a RANAC 2, and a RANAC of the cell 3 is a RANAC 3. When the first device is at a moment 2, a TA of the cell 1 is a RANAC 1', a TA of the cell 2 is a RANAC 2', and a RANAC of the cell 3 is a RANAC 3'. The RANAC 1 and the RANAC 1' may be the same, or the RANAC 1 and the RANAC may be different. The RANAC 2 and the RANAC 2' may be the same, or the RANAC 2 and the RANAC 2' may be different. The RANAC 3 and the RANAC 3' may be the same, or the RANAC 3 and the RANAC 3' may be different.

TABLE 13

| Group number | Moment | RANAC of each cell covered by the first device |
| --- | --- | --- |
| Group 1 | Moment 1 | RANAC 1 of the cell 1 |
|  |  | RANAC 2 of the cell 2 |
|  |  | RANAC 3 of the cell 3 |
| Group 2 | Moment 2 | RANAC 1' of the cell 1 |
|  |  | RANAC 2' of the cell 2 |
|  |  | RANAC 3' of the cell 3 |

For example, Table 14 shows another firm of the second information, where M is 2, and the first device covers three cells, which are separately a cell 1, a cell 2, and a cell 3. To be specific, the second information includes a correspondence between two groups of latitude and longitude information and two groups of RANACs, where each group of RANACs includes RANACs of the three cells. When the cell 1 covered by the first device is at a location indicated by latitude and longitude information 1, a RANAC of the cell 1 is a RANAC 1; when the cell 2 covered by the first device is at a location indicated by latitude and longitude information 2, a RANAC of the cell 2 is a RANAC 2; when the cell 3 covered by the first device is at a location indicated by latitude and longitude information 3, a RANAC of the cell 3 is a RANAC 3. When the cell 1 covered by the first device is at a location indicated by latitude and longitude information 1', a RANAC of the cell 1 is a RANAC 1; when the cell 2 covered by the first device is at a location indicated by latitude and longitude information 2', a RANAC of the cell 2 is a RANAC 2'; when the cell 3 covered by the first device is at a location indicated by latitude and longitude information 3', a RANAC of the cell 3 is a RANAC 3'. The RANAC 1 and the RANAC 1' may be the same, or the RANAC 1 and the RANAC 1' may be different. The RANAC 2 and the RANAC 2' may be the same, or the RANAC 2 and the RANAC 2' may be different. The RANAC 3 and the RANAC 3' may be the same, or the RANAC 3 and the RANAC 3' may be different.

TABLE 14

| Group number | Latitude and longitude information of each cell covered by the first device | RANAC of each cell covered by the first device |
| --- | --- | --- |
| Group 1 | Latitude and longitude information 1 of the cell 1 | RANAC 1 of the cell 1 |
|  | Latitude and longitude information 2 of the cell 2 | RANAC 2 of the cell 2 |
|  | Latitude and longitude information 3 of the cell 2 | RANAC 3 of the cell 3 |
| Group 2 | Latitude and longitude information 1' of the cell 1 | RANAC 1' of the cell 1 |
|  | Latitude and longitude information 2' of the cell 2 | RANAC 2' of the cell 2 |
|  | Latitude and longitude information 3' of the cell 2 | RANAC 3' of the cell 3 |

Step 230: The first device obtains the second information.

Optionally, the first device may receive the second information sent by the first core network device. Correspondingly, the first core network device sends the second information to the first device.

The second information is included in an NG interface setup response message. That the second information is included in an NG interface setup response message may be understood as follows: When the first device sets up the NG interface with the first core network device, the first device receives the NG interface setup response message sent by the first core network device, where the NO interface setup response message carries the second information Optionally, the method 200 may further include step 240.

Step 240: The first device sends the second information to at least one third device. Correspondingly, the at least one third device receives the second information sent by the first device.

Optionally, the second information may be included in an Xn interface setup request message exchanged between the first device and the third device. That the second information may be included in an Xn interface setup request message exchanged between the first device and the second device may be understood as follows: When the first device sets up an Xn interface with the second device, the first device sends the Xn interface setup request message to the third device, where the Xn interface setup request message carries the second information.

The first device sends, to the at least one third device, an identifier of an area covered by the first device at each location. Therefore, flexibility of a communication system is improved, The first device sends location information of the first device at each moment to the first core network device. The first core network device determines, based on the location information of the first device at each moment, the identifier of the area covered by the first device at each location, and sends, to the first device, the identifier of the area covered by the first device at each location. In this way, the first device and the first core network device exchange in time the area covered by the first device. Therefore, the first device obtains in time the area covered by the first device, and storage load of the first device is reduced. In addition, the first core network device can also effectively page a terminal device, and efficiency of paging the terminal device by the first core network device is improved.

Figure 8:
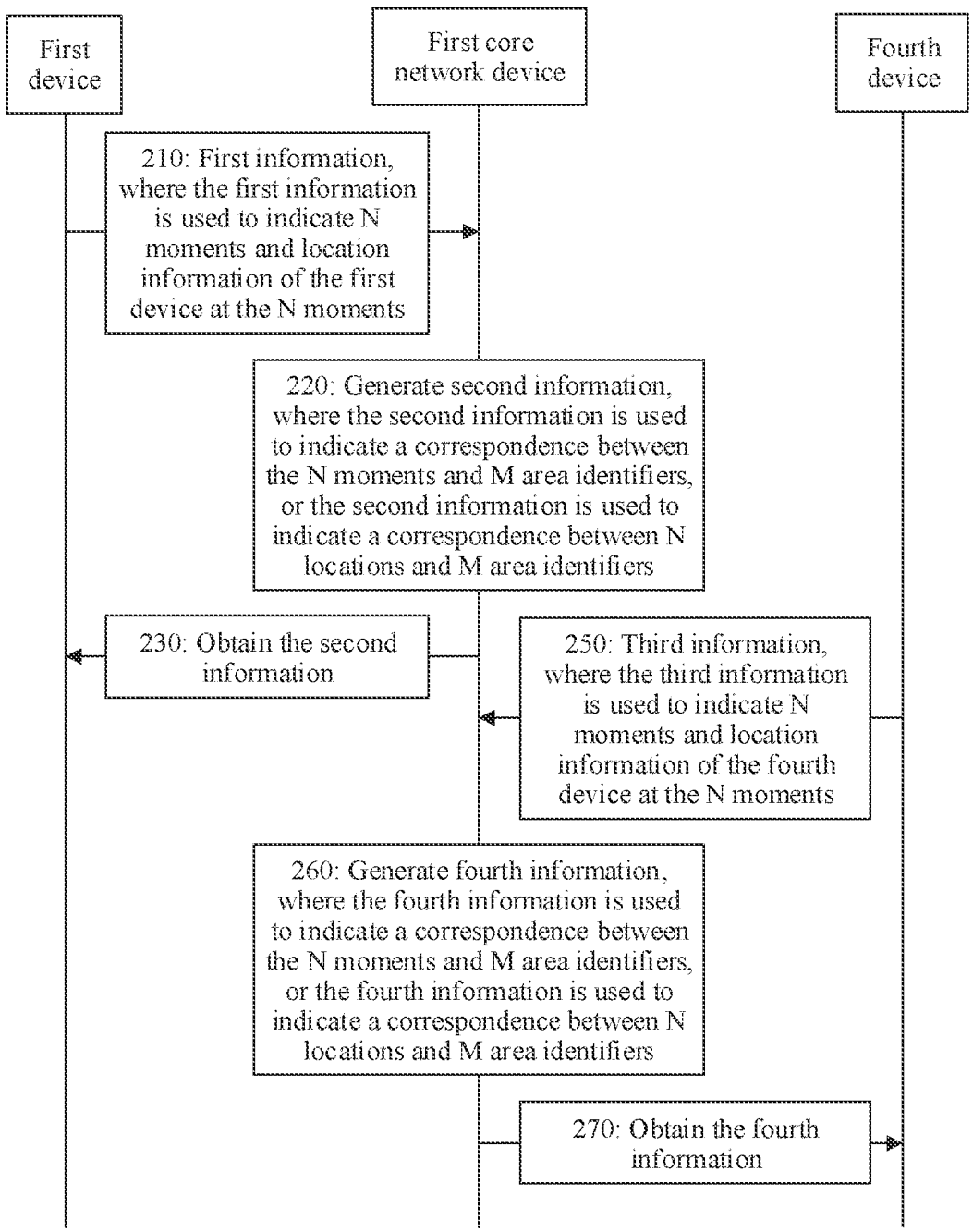
FIG. 8 is a schematic flowchart of another communication method 200 according to an embodiment of this application.

Optionally, as shown in FIG. 8, the method 200 may further include step 250 to step 270.

Step 250: A fourth device sends third information, where the third information is used to indicate N moments and location information of the fourth device at the N moments.

The location information of the fourth device at the N moments may be understood as that each of the N moments corresponds to one piece of location information of the fourth device.

Pieces of location information of the fourth device that correspond to the N moments may be all different. Alternatively, the pieces of location information of the fourth device that correspond to the N moments may include same location information of the fourth device, that is, pieces of location information of the fourth device that correspond to the fourth device at p moments are the same, where $p \in [0, N]$.

Optionally, the fourth device may send the third information to the first core network device. Correspondingly, the first core network device receives the third information sent by the fourth device.

The third information may include the N moments and latitude and longitude information corresponding to the fourth device at the N moments, as described in the following form 1'. Alternatively, the third information may include the N moments and N groups of latitude and longitude information of the fourth device at the N moments, as described in the following form 2'. Each of the N groups of latitude and longitude information includes latitude and longitude information of at least one cell, and the at least one cell is at least one cell covered by the fourth device.

The following separately describes in detail content included in the fourth information with reference to the form 1' and the form 2'.

Form 1': The third information may include the N moments and the latitude and longitude information corresponding to the fourth device at the N moments, For example, Table 15 shows a form of the third information, where N is 2. To be specific, the third information includes two moments and latitude and longitude information corresponding to the fourth device at the two moments. To be specific, a location of the fourth device at a moment a is indicated by latitude and longitude information a, and a location of the fourth device at a moment b is indicated by latitude and longitude information b. The latitude and longitude information a and the latitude and longitude information b may be the same, or the latitude and longitude information a and the latitude and longitude information b may be different.

TABLE 15

| Latitude and longitude information of the fourth device | Moment |
|---|---|
| Latitude and longitude information a | Moment a |
| Latitude and longitude information b | Moment b |

Form 2': The third information may include the N moments and the N groups of latitude and longitude information of the fourth device at the N moments. Each of the N groups of latitude and longitude information includes latitude and longitude information of at least one cell, and the at least one cell is at least one cell covered by the fourth device.

For example, Table 16 shows another form of the third information, where N is 2, and the fourth device covers three cells, which are separately a cell a, a cell b, and a cell c. To be specific, the third information includes two moments and two groups of latitude and longitude information of the fourth device at the two moments, and each group of latitude and longitude information includes latitude and longitude information of the three cells. To be specific, when the fourth device is at a moment a, a location of the cell a is indicated by latitude and longitude information a, a location of the cell b is indicated by latitude and longitude information b, and a location of the cell c is indicated by latitude and longitude information c; when the fourth device is at a moment 2, a location of the cell a is indicated by latitude and longitude information a', a location of the cell b is indicated by latitude and longitude information b', and a location of the cell c is indicated by latitude and longitude information c'. The latitude and longitude information a and the latitude and longitude information a' may be the same, or the latitude and longitude information a and the latitude and longitude information a' may be different. The latitude and longitude information b and the latitude and longitude information b' may be the same, or the latitude and longitude information b and the latitude and longitude information b' may be different. The latitude and longitude information c and the latitude and longitude information c' may be the same, or the latitude and longitude information c and the latitude and longitude information c' may be different.

TABLE 16

| Group number | Latitude and longitude information of each cell covered by the fourth device | Moment |
|---|---|---|
| Group 1 | Latitude and longitude information a of the cell a<br>Latitude and longitude information b of the cell b<br>Latitude and longitude information c of the cell c | Moment a |
| Group 2 | Latitude and longitude information a' of the cell a<br>Latitude and longitude information b' of the cell b<br>Latitude and longitude information c' of the cell c | Moment b |

Step 260: The first core network device generates fourth information, where the fourth information is used to indicate a correspondence between the N moments and M area identifiers, or the fourth information is used to indicate a correspondence between N locations and M area identifiers.

An $m^{th}$ TA in the M area identifiers is an area covered by the fourth device at a moment or a location corresponding to an $m^{th}$ area identifier, and $m \in [1, M]$.

Optionally, the area identifier includes a TAC or a RANAC.

When the third information includes the N moments and the latitude and longitude information corresponding to the fourth device at the N moments, the fourth information includes the correspondence between the N moments and the M area identifiers, or the fourth information includes a correspondence between N pieces of latitude and longitude information and the M area identifiers, as described in the following form A'.

When the third information includes the N moments and the N groups of latitude and longitude information corresponding to the fourth device at the N moments, the fourth information includes a correspondence between the N moments and M groups of area identifiers, or the fourth information includes a correspondence between the N groups of latitude and longitude information and M groups of area identifiers, as described in the following form B'.

The following separately describes in detail content included in the fourth information with reference to the form A' and the form B'.

Form A': The fourth information includes the correspondence between the N moments and the M area identifiers.

Case 1: The area identifier includes the TAC.

For example, Table 17 shows a form of the fourth information, where N is 2, M is also 2, and the area identifier is the TAC. To be specific, the fourth information includes a correspondence between two moments and two TACs. To be specific, when the fourth device is at a moment a, a TAC of a TA covered by the fourth device is a TAC when the fourth device is at a moment b, a TAC of a TA covered by the fourth device is a TAC b. The TAC a and the TAC b may be the same, or the TAC a and the TAC b may be different.

TABLE 17

| Moment | TAC of a TA covered by the fourth device |
|---|---|
| Moment a | TAC a |
| Moment b | TAC b |

For example, Table 18 shows another form of the fourth information, where N is 2, M is 4, and the area identifier is the TAC. To be specific, the fourth information includes a correspondence between two moments and four TACs. To be specific, when the fourth device is at a moment a, TACs of TAs covered by the fourth device are a TAC a and a TAC c; when the fourth device is at a moment b, TACs of TAs covered by the fourth device are a TAC b and a TAC d. The TAC a and the TAC b may be the same, or the TAC a and the TAC b may be different. The TAC a and the TAC d may be the same, or the TAC a and the TAC d may be different. The TAC c and the TAC b may be the same, or the TAC c and the TAC b may be different. The TAC c and the TAC d may be the same, or the TAC c and the TAC d may be different.

TABLE 18

| Moment | TAC of a TA covered by the fourth device |
|---|---|
| Moment a | TAC a and TAC c |
| Moment h | TAC b and TAC d |

For example, Table 19 shows still another form of the fourth information, where N is 2, M is also 2, and the area identifier is the TAC. To be specific, the fourth information includes a correspondence between two pieces of latitude and longitude information and two TACs. To be specific, when the fourth device is at a location indicated by latitude and longitude information a, a TAC of a TA covered by the fourth device is a TAC a; when the fourth device is at a location indicated by latitude and longitude information h, a TAC of a TA covered by the fourth device is a TAC b. The TAC a and the TAC b may be the same, or the TAC a and the TAC b may be different.

TABLE 19

| Latitude and longitude information of the fourth device | TAC of a TA covered by the fourth device |
|---|---|
| Latitude and longitude information a | TAC a |
| Latitude and longitude information b | TAC b |

For example, Table 20 shows still another form of the fourth information, where N is 2, M is 4, and the area identifier is the TAC. To be specific, the fourth information includes a correspondence between two pieces of latitude and longitude information and four TACs. To be specific, when the fourth device is at a location indicated by latitude and longitude information a, TACs of TAs covered by the fourth device are a TAC a and a TAC c; when the fourth device is at a location indicated by latitude and longitude information b. TACs of TAs covered by the fourth device are a TAC b and a TAC d. The TAC a and the TAC b may be the same, or the TAC a and the TAC b may be different. The TAC a and the TAC d may be the same, or the TAC a and the TAC d may be different. The TAC c and the TAC b may be the same, or the TAC c and the TAC b may be different. The TAC c and the TAC d may be the same, or the TAC c and the TAC d may be different.

TABLE 20

| Latitude and longitude information of the fourth device | TAC of a TA covered by the fourth device |
|---|---|
| Latitude and longitude information a | TAC a and TAC c |
| Latitude and longitude information b | TAC b and TAC d |

Case 2: The area identifier includes the RANAC.

For example, Table 21 shows a firm of the fourth information, where N is 2, M is also 2, and the area identifier is the RANAC. To be specific, the fourth information includes a correspondence between two moments and two RANACs. To be specific, when the fourth device is at a moment a, a RANAC of a RAN area covered by the fourth device is a RANAC a; when the fourth device is at a moment b, a RANAC of a RAN area covered by the fourth device is a RANAC b. The RANAC a and the RANAC b may be the same, or the RANAC a and the RANAC b may be different.

TABLE 21

| Moment | RANAC of a RAN area covered by the fourth device |
|---|---|
| Moment a | RANAC a |
| Moment b | RANAC b |

For example, Table 22 shows another form of the fourth information, where N is 2, M is 4, and the area identifier is the RANAC. To be specific, the fourth information includes a correspondence between two moments and four RANACs. To be specific, when the fourth device is at a moment a, RANACs of RAN areas covered by the fourth device are a RANAC and a RANAC c; when the fourth device is at a moment b, RANACs of RAN areas covered by the fourth device are a RANAC b and a RANAC d. The RANAC a and the RANAC h may be the same, or the RANAC a and the RANAC b may be different. The RANAC a and the RANAC d may be the same, or the RANAC a and the RANAC d may be different. The RANAC c and the RANAC b may be the same, or the RANAC c and the RANAC b may be different. The RANAC c and the RANAC d may be the same, or the RANAC c and the RANAC d may be different.

TABLE 22

| Moment | RANAC of a RAN area covered by the fourth device |
|---|---|
| Moment 1 | RANAC a and RANAC c |
| Moment 2 | RANAC b and RANAC d |

For example, Table 23 shows still another form of the fourth information, where N is 2, M is also 2, and the area identifier is the RANAC. To be specific, the fourth information includes a correspondence between two pieces of latitude and longitude information and two RANACs. To be specific, when the fourth device is at a location indicated by latitude and longitude information a, a RANAC of a RAN area covered by the fourth device is a RANAC a; when the fourth device is at a location indicated by latitude and longitude information b, a RANAC of a RAN area covered by the fourth device is a RANAC b. The RANAC a and the RANAC b may be the same, or the RANAC a and the RANAC b may be different.

TABLE 23

| Latitude and longitude information of the fourth device | RANAC of a RAN area covered by the fourth device |
|---|---|
| Latitude and longitude information a | RANAC a |
| Latitude and longitude information b | RANAC b |

For example, Table 24 shows still another form of the fourth information, where N is 2, M is 4, and the area identifier is the RANAC. To be specific, the fourth information includes a correspondence between two pieces of latitude and longitude information and four RANACs. To be specific, when the fourth device is at a location indicated by latitude and longitude information a, RANACs of RAN areas covered by the fourth device are a RANAC a and a RANAC c; when the fourth device is at a location indicated by latitude and longitude information b, RANACs of RAN areas covered by the fourth device are a RANAC b and a RANAC d. The RANAC a and the RANAC b may be the same, or the RANAC a and the RANAC b may be different. The RANAC a and the RANAC d may be the same, or the RANAC a and the RANAC d may be different. The RANAC c and the RANAC b may be the same, or the RANAC c and the RANAC b may be different. The RANAC c and the RANAC d may be the same, or the RANAC c and the RANAC d may be different.

TABLE 24

| Latitude and longitude information of the fourth device | RANAC of a RAN area covered by the fourth device |
|---|---|
| Latitude and longitude information 1 | RANAC a and RANAC c |
| Latitude and longitude information 2 | RANAC b and RANAC d |

Form B': The fourth information includes a correspondence between the N moments and M groups of TAs, or the fourth information includes a correspondence between the N groups of latitude and longitude information and M groups of TAs.

Case 1: The area identifier includes the TAC.

For example. Table 25 shows a form of the fourth information, where N is 2. M is 2, and the fourth device covers three cells, which are separately a cell a, a cell b, and a cell c. To be specific, the fourth information includes a correspondence between two moments and two groups of TACs, where each group of TAs includes TACs of the three cells. When the fourth device is at a moment a, a TAC of the cell a is a TAC a, a TAC of the cell b is a TAC b and a TAC of the cell c is a TAC c; when the fourth device is at a moment b, a TA of the cell a is a TAC a', a TAC of the cell h is a TAC b', and a TAC of the cell c is a TAC c'. The TAC a and the TAC a' may be the same, or the TAC a and the TAC a' may be different. The TAC b and the TAC b' may be the same, or the TAC b and the TAC g' may be different. The TAC c and the TAC c' may be the same, or the TAC c and the TAC c' may be different.

TABLE 25

| Group number | Moment | TAC of each cell covered by the fourth device |
|---|---|---|
| Group 1 | Moment a | TAC a of the cell a |
| | | TAC b of the cell b |
| | | TAC c of the cell c |
| Group 2 | Moment b | TAC a' of the cell a |
| | | TAC b' of the cell b |
| | | TAC c' of the cell c |

For example, Table 26 shows another form of the fourth information, where M is 2, N is 2, and the fourth device covers three cells, which are separately a cell a, a cell b, and a cell c. To be specific, the fourth information includes a correspondence between two groups of latitude and longitude information and two groups of TACs, where each group of TACs includes TACs of the three cells. When the cell a covered by the fourth device is at a location indicated by latitude and longitude information a, a TAC of the cell a is a TAC a; when the cell 2 covered by the fourth device is at a location indicated by latitude and longitude information b, a TAC of the cell h is a AC b; when the cell c covered by the fourth device is at a location indicated by latitude and longitude information c, a TAC of the cell c is a TAC c. When the cell a covered by the fourth device is at a location indicated by latitude and longitude information a', a TAC of the cell a is a TAC a; when the cell b covered by the fourth device is at a location indicated by latitude and longitude information b', a TAC of the cell b is a TAC b'; when the c covered by the fourth device is at a location indicated by latitude and longitude information c', a TAC of the cell c is a TAC c'. The TAC a and the TAC a may be the same, or the TAC a and the TAC a may be different. The TAC b and the TAC b' may be the same, or the TAC b and the TAC b' may be different. The TAC c and the TAC c' may be the same, or the TAC c and the TAC c' may be different

TABLE 26

| Group number | Latitude and longitude information of each cell covered by the fourth device | TAC of each cell covered by the fourth device |
|---|---|---|
| Group 1 | Latitude and longitude information a of the cell a | TAC a of the cell a |
| | Latitude and longitude information b of the cell b | TAC b of the cell b |
| | Latitude and longitude information c of the cell c | TAC c of the cell c |
| Group 2 | Latitude and longitude information a' of the cell a | TAC a' of the cell a |
| | Latitude and longitude information b' of the cell b | TAC b' of the cell b |
| | Latitude and longitude information c' of the cell c | TAC c' of the cell c |

Case 2: The area identifier includes the RANAC.

For example, Table 27 shows a form of the fourth information, where M is 2, and the fourth device covers three cells, which are separately a cell a, a cell b, and a cell c. To be specific, the fourth information includes a correspondence between two moments and two groups of RANACs, where each group of TAs includes RANACs of the three cells. When the fourth device is at a moment a, a RANAC of the cell a is a RANAC a, a RANAC of the cell b is a RANAC b, and a RANAC of the cell c is a RANAC c. When the fourth device is at a moment b, a RANAC of the cell a is a RANAC a', a RANAC of the cell b is a RANAC b', and a RANAC of the cell c is a RANAC c'. The RANAC a and the RANAC a' may be the same, or the RANAC a and the RANAC a may be different. The RANAC b and the RANAC b' may be the same, or the RANAC b and the RANAC b' may be different. The RANAC c and the RANAC c' may be the same, or the RANAC c and the RANAC c' may be different.

TABLE 27

| Group number | Moment | RANAC of each cell covered by the fourth device |
|---|---|---|
| Group 1 | Moment a | RANAC a of the cell a<br>RANAC b of the cell b<br>RANAC c of the cell c |
| Group 2 | Moment b | RANAC a' of the cell a<br>RANAC b' of the cell b<br>RANAC c' of the cell c |

For example, Table 28 shows another form of the fourth information, where M is 2, N is 2, and the fourth device covers three cells, which are separately a cell a, a cell b, and a cell c. To be specific, the fourth information includes a correspondence between two groups of latitude and longitude information and two groups of RANACs, where each group of RANACs includes RANACs of the three cells. When the cell a covered by the fourth device is at a location indicated by latitude and longitude information a, a RANAC of the cell a is a RANAC a; when the cell h covered by the fourth device is at a location indicated by latitude and longitude information b, a RANAC of the cell h is a RANAC b; when the cell c covered by the fourth device is at a location indicated by latitude and longitude information c, a RANAC of the cell c is a RANAC c. When the cell a covered by the fourth device is at a location indicated by latitude and longitude information a', a RANAC of the cell a is a RANAC a'; when the cell b covered by the fourth device is at a location indicated 1w latitude and longitude information b', a RANAC of the cell 2 is a RANAC b'; when the cell c covered by the fourth device is at a location indicated by latitude and longitude information c', a RANAC of the cell 3 is a RANAC c'. The RANAC a and the RANAC may be the same, or the RANAC a and the RANAC a' may be different. The RANAC b and the RANAC b' may be the same, or the RANAC b and the RANAC b' may be different. The RANAC c and the RANAC c' may be the same, or the RANAC c and the RANAC c' may be different.

TABLE 28

| Group number | Latitude and longitude information of each cell covered by the fourth device | RANAC of each cell covered by the fourth device |
|---|---|---|
| Group 1 | Latitude and longitude information a of the cell a<br>Latitude and longitude information b of the cell b<br>Latitude and longitude information c of the cell c | RANAC a of the cell a<br>RANAC b of the cell b<br>RANAC c of the cell c |
| Group 2 | Latitude and longitude information a of the cell a<br>Latitude and longitude information b' of the cell b<br>Latitude and longitude information c' of the cell c | RANAC a' of the cell a<br>RANAC b' of the cell b<br>RANAC c' of the cell c |

Step 270: The fourth device obtains the fourth information.

Optionally, the fourth device may receive the fourth information sent by the first core network device. Correspondingly, the first core network device sends the fourth information to the fourth device.

The fourth information is included in an NG interface setup response message. That the fourth information is included in an NG interface setup response message may be understood as follows: When the fourth device sets up an NG interface with the first core network device, the fourth device receives the NG interface setup response message sent by the first core network device, where the NG interface setup response message carries the fourth information.

Optionally, the method 200 may further include step 280.

Step 280: The fourth device sends the fourth information to the at least one third device. Correspondingly, the at least one third device receives the fourth information sent by the first device.

Optionally, the fourth information may be included in an Xn interface setup request message exchanged between the first device and the third device. That the fourth information may be included in an Xn interface setup request message exchanged between the first device and the third device may be understood as follows: When the first device sets up an Xn interface with the third device, the first device sends the Xn interface setup request message to the third device, where the Xn interface setup request message carries the fourth information.

The method 200 further includes step 290 to step 293.

Step 290: The first core network device determines a fifth device corresponding to a first area identifier at a first moment based on the second information and the fourth information, where the first area identifier is an area identifier in an area identifier list of the to-be-paged terminal device, and the fifth device is one of the first device and the fourth device.

For example, when the first moment is a moment a, the to-be-paged terminal device is located in a tracking area A. In this case, at the moment a, a TAC of an area covered by the fourth device is a TAC a corresponding to the tracking area A, so that the first core network device determines the fourth device as the fifth device. In other words, in this case, the to-be-paged terminal device is in the area covered by the fourth device.

For another example, when the first moment is a moment b, the to-be-paged terminal device is located in a tracking area 2. In this case, at the moment b, a TAC of an area covered by the fourth device is a TAC corresponding to the tracking area 2, so that the first core network device determines the third device as the fifth device. In other words, in this case, the to-be-paged terminal device is in the area covered by the third device, Step 291: The first core network device sends a first paging message to the fifth device. Correspondingly, the fifth device receives the first paging message sent by the first core network device, The first paging message includes the first area identifier and an identifier of a terminal device, and the identifier of the terminal device is an identifier of the to-be-paged terminal device.

After the fifth device receives the first paging message, the fifth device searches for the to-be-paged terminal device, and sends the first paging message to all terminal devices in a first area. All the terminal devices each determine whether an identifier of the terminal device is the same as the identifier of the to-be-paged terminal device in the first paging message. When the identifier of the terminal device is the same as the identifier of the to-be-paged terminal device in the first paging message, the terminal device initiates an RRC setup request to establish a radio link to the fifth device. After paging is stopped, if the fifth device has not found the to-be-paged terminal device, the fifth device performs step 292 and step 293.

Step 292: The fifth device determines a sixth device corresponding to a first area identifier at the first moment based on second information corresponding to another device, where the first area identifier is an area identifier in the area identifier list of the to-be-paged terminal device.

The sixth device is an access network device.

For example, when the first moment is a moment 1, the to-be-paged terminal device is located in a tracking area 1. In this case, at the moment 1, a RANAC of an area covered by the sixth device is a RANAC corresponding to the tracking area 1. In this case, the to-be-paged terminal device is in the area covered by the sixth device.

For another example, when the first moment is a moment b, the to-be-paged terminal device is located in a tracking area 2. In this case, at the moment b, a RANAC of an area covered by the sixth device is a RANAC corresponding to the tracking area 2. In other words, in this case, the to-be-paged terminal device is in the area covered by the sixth device.

Step 293: The fifth device sends the first paging message to the sixth device. Correspondingly, the sixth device receives the first paging message sent by the fifth device.

The first paging message includes the first area identifier and the to-be-paged terminal device.

After the sixth device receives the first paging message, the sixth device searches for the to-be-paged terminal device, and sends the first paging message to all terminal devices in a first area. All the terminal devices each determine whether an identifier of the terminal device is the same as the identifier of the to-be-paged terminal device in the first paging message. When the identifier of the terminal device is the same as the identifier of the to-be-paged terminal device in the first paging message, the terminal device initiates an RRC setup request to establish a radio link to the sixth device.

Figure 9:
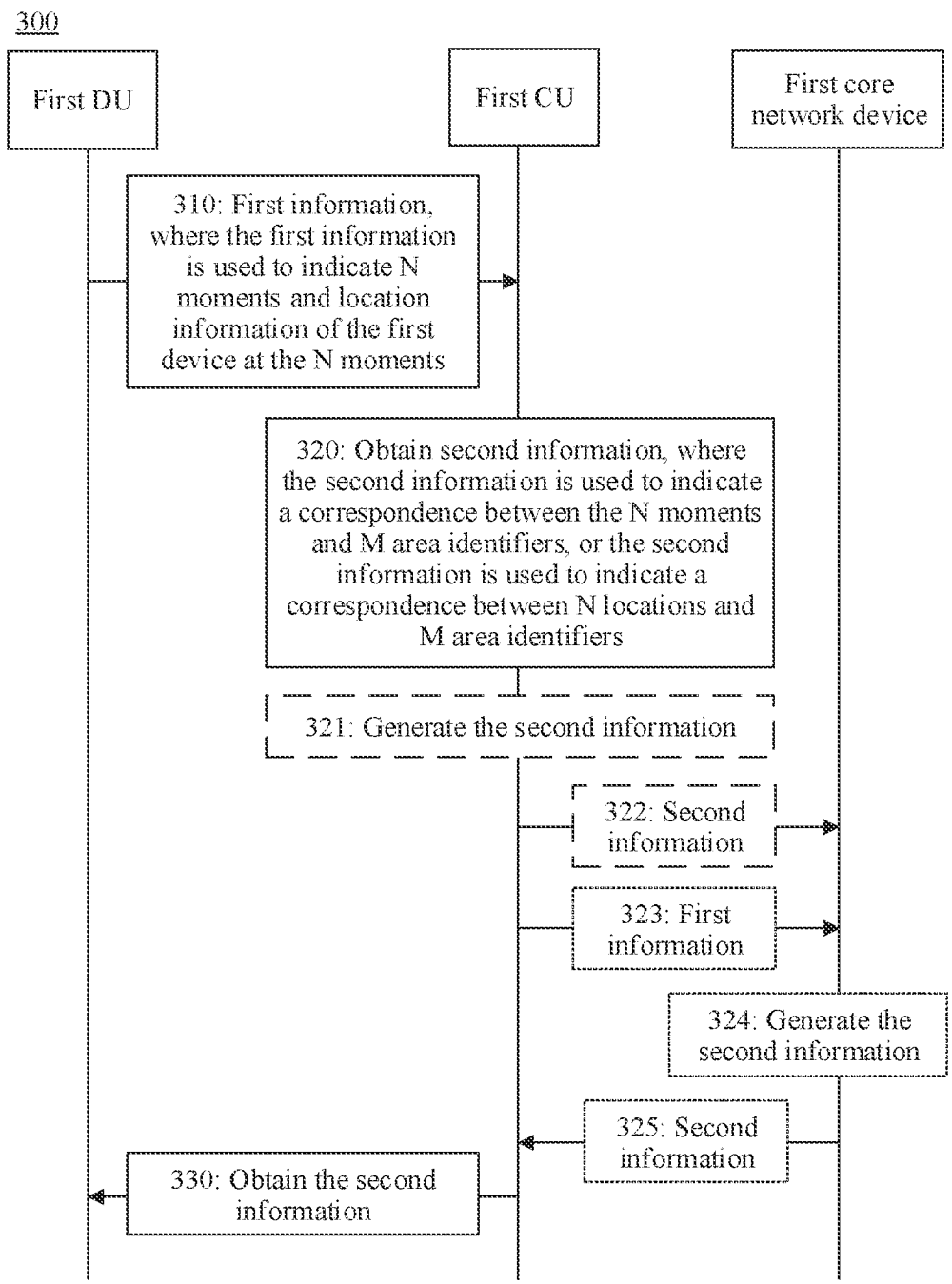
FIG. 9 is a schematic flowchart of still another communication method 300 according to an embodiment of this application.

FIG. 9 is a schematic flowchart of a communication method 300 according to this application. With reference to FIG. 9, the following describes the communication method 300 provided in an embodiment of this application. The method 300 includes step 310 to step 370. In the method 300, a first DU may be the DU carried in the satellite in FIG. 6, and a first CU may be the CU disposed on the ground in FIG. 6.

Step 310: The first DU sends first information to the first CU, where the first information is used to indicate N moments and location information of the first DU at the N moments.

The location information of the first DU at the N moments may be understood as that each of the N moments corresponds to one piece of location information of the first DU.

Pieces of location information of the first DU that correspond to the N moments may be all different. Alternatively, the pieces of location information of the first DU that correspond to the N moments may include same location information of the first device, that is, pieces of location information of the first DU that correspond to the first DU at q moments are the same, where $1 \in [0, N]$.

Optionally, the first information is included in an F1 interface setup message or a first configuration update message.

That the first information is included in an F1 interface setup message may be understood as follows: When the first DU sets up an F1 interface with the first CU, the F1 interface setup message sent by the first DU to the first CU carries the first information. That the first information is included in a first configuration update message may be understood as follows: The first DU sends the first configuration update message to the first CU, where the first configuration update message carries the first information, and the first configuration update message may be a first DU configuration update message.

The first information may include the N moments and latitude and longitude information corresponding to the first DU at the N moments. Alternatively, the first information may include the N moments and N groups of latitude and longitude information of the first DU at the N moments. Each of the N groups of latitude and longitude information includes latitude and longitude information of at least one cell, and the at least one cell is at least one cell covered by the first DU.

Step 320: The first CU obtains second information, where the second information is used to indicate a correspondence between the N moments and M area identifiers, or the second information is used to indicate a correspondence between N locations and M area identifiers.

Optionally, the second information is included in an F1 interface setup response message or a first configuration update response message.

That the second information is included in an F1 interface setup response message may be understood as follows: When the first CU sets up the F1 interface with the first DU, the F1 interface setup response message sent by the first DU to the first CU carries the second information. That the second information is included in a first configuration update response message may be understood as follows: The first DU sends the first configuration update response message to the first CU, where the first configuration update response message carries the second information, and the first configuration update response message may be a DU configuration update response message.

An $m^{th}$ TA in the M area identifiers is an area covered by the first device at a moment or a location corresponding to an $m^{th}$ area identifier, and $m \in [1, M]$.

Optionally, the area identifier includes a TAC or a RANAC.

When the first information includes the N moments and the latitude and longitude information corresponding to the first DU at the N moments, the second information includes the correspondence between the N moments and the M area identifiers, or the second information includes a correspondence between N pieces of latitude and longitude information and the M area identifiers, When the first information includes the N moments and the N groups of latitude and longitude information corresponding to the first DU at the N moments, the second information includes a correspondence between the N moments and M groups of area identifiers, or the second information includes a correspondence between the N groups of latitude and longitude information and M groups of area identifiers.

The second information is generated by the first CU, or the second information is generated by a first core network device.

When the second information is generated by the first CU, the method 300 further includes step 321 and step 322.

Step 321: The first CU generates the second information.

Step 322: The first CU sends the second information to the first core network device. Correspondingly, the first core network device receives the second information sent by the first CU.

When the second information is determined by the first core network device, the method 300 further includes step 323 to step 325.

Step 323: The first CU sends the first information to the first core network device. Correspondingly, the first core network device receives the first information sent by the first CU.

Step 324: The first core network device generates the second information based on the first information.

Step 325: The first core network device sends the second information to the first CU. Correspondingly, the first CU receives the second information sent by the first core network device.

Step 330: The first CU sends the second information to the first DU.

Optionally, the method 300 may further include step 340.

Step 340: The first CU sends the second information to at least one third device. Correspondingly, the at least one third device receives the second information sent by the first CU.

The third device includes a DU.

The first DU sends, to the at least one third device, an identifier of an area covered by the first DU at each location. Therefore, flexibility of a communication system is improved.

For content that is not described in step 310 to step 340, refer to the descriptions of the content in step 210 to step 240.

The first DU sends location information of the first DU at each moment to the first CU. The first CU determines, based on the location information of the first DU at each moment, the identifier of the area covered by the first Du at each location. Alternatively, the first CU sends the location information of the first DU at each moment to the first core network device, and the first core network device determines the identifier of the area covered by the first DU at each location and sends the identifier of the area covered by the first DU at each location to the first CU. Further, the first CU sends the identifier of the area covered by the first DU at each location to the first DU. In this way, the first DU and the first CU exchange in time the area covered by the first DU, or the first DU and the first core network device exchange in time the area covered by the first DU. Therefore, the first DU obtains in time the area covered by the first DU, and storage load of the first DU is reduced. In addition, the first core network device can also effectively page a terminal device, and efficiency of paging the terminal device by the first core network device is improved.

Figure 10A:
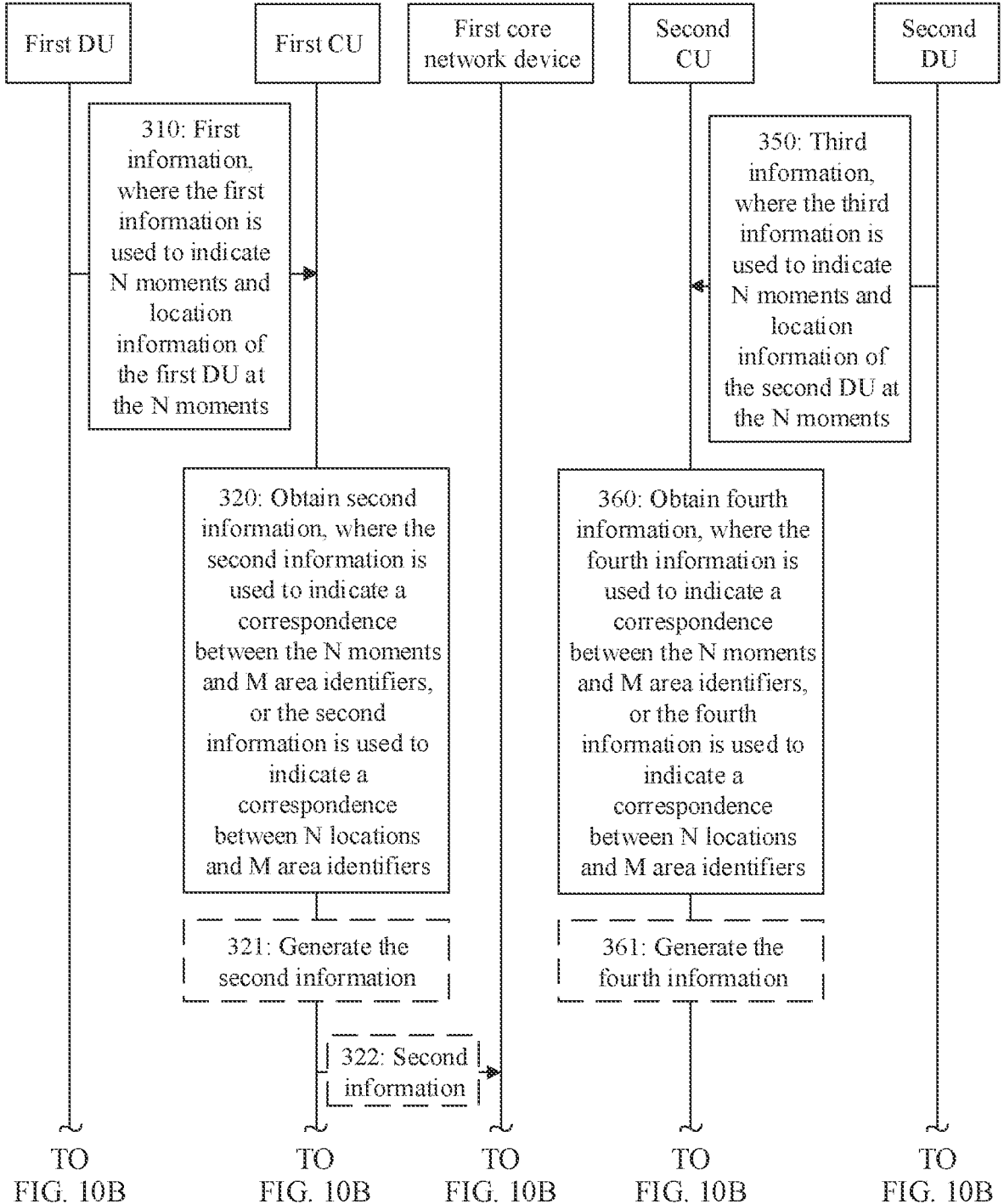
FIG. 10A and FIG. 10B are a schematic flowchart of still another communication method 300 according to an embodiment of this application.
Figure 10B:
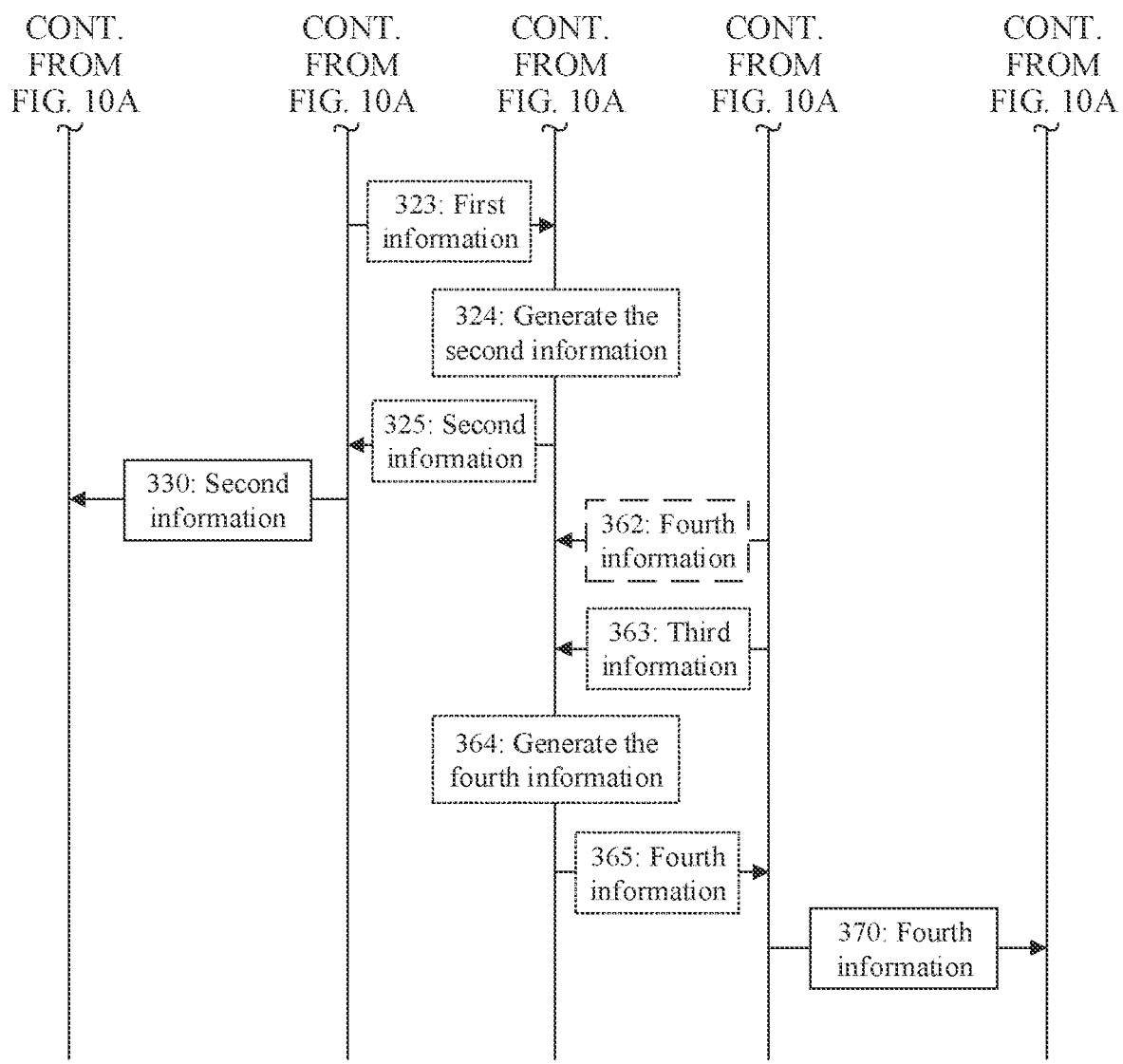

Optionally, as shown in FIG. 10A and FIG. 10B, the method 300 may further include step 350 and step 360.

In the following descriptions, in step 350 and step 360, a second DU may be the DU carried in the satellite in FIG. 6, a second CU may be the CU disposed on the ground in FIG. 6.

Step 350: The second DU sends third information to the second CU, where the third information is used to indicate N moments and location information of the second DU at the N moments.

The location information of the second DU at the N moments may be understood as that each of the N moments corresponds to one piece of location information of the second DU.

Pieces of location information of the second DU that correspond to the N moments may be all different. Alternatively, the pieces of location information of the second DU that correspond to the N moments may include same location information of the first device, that is, pieces of location information of the second DU that correspond to the second. DU at w moments are the same, where w∈[0, N].

Optionally, the third information is included in an F1 interface setup message or a first configuration update message.

That the third information is included in an F1 interface setup message may be understood as follows: When the second DU sets up an F1 interface with the second CU, the F1 interface setup message sent by the second DU to the second CU carries the third information. That the third information is included in a first configuration update message may understood as follows: The second DU sends the first configuration update message to the second CU, where the first configuration update message carries the third information, and the first configuration update message may be a second DU configuration update message.

The third information may include the N moments and latitude and longitude information corresponding to the second DU at the N moments. Alternatively, the third information may include the N moments and N groups of latitude and longitude information of the second DU at the N moments. Each of the N groups of latitude and longitude information includes latitude and longitude information of at least one cell, and the at least one cell is at least one cell covered by the second DU.

Step 360: The second. CU obtains fourth information, where the fourth information is used to indicate a correspondence between the N moments and M area identifiers, or the fourth information is used to indicate a correspondence between N locations and M area identifiers.

Optionally, the fourth information is included in an F1 interface setup response message or a first configuration update response message.

That the fourth information is included in an F1 interface setup response message may be understood as follows: When the second CU sets up the F1 interface with the second DU, the F1 interface setup response message sent by the second DU to the second CU carries the fourth information. That the fourth information is included in a first configuration update response message may be understood as follows: The second DU sends the first configuration update response message to the second CU, where the first configuration update response message carries the fourth information, and the first configuration update response message may be a DU configuration update response message.

An $m^{th}$ TA in the M area identifiers is an area covered by the first device at a moment or a location corresponding to an $m^{th}$ area identifier, and $m\in[1, M]$.

Optionally, the area identifier includes a TAC or a RANAC.

When the third information includes the N moments and the latitude and longitude information corresponding to the second DU at the N moments, the fourth information includes the correspondence between the N moments and the M area identifiers, or the fourth information includes a correspondence between N pieces of latitude and longitude information and the M area identifiers.

When the third information includes the N moments and the N groups of latitude and longitude information corresponding to the second DU at the N moments, the fourth information includes a correspondence between the N moments and M groups of area identifiers, or the fourth information includes a correspondence between the N groups of latitude and longitude information and M groups of area identifiers.

The fourth information is generated by the second CU, or the fourth information is generated by the first core network device, When the fourth information is generated by the second CU, the method 300 further includes step 361 and step 362.

Step 361: The second CU generates the fourth information.

Step 362: The second CU sends the fourth information to the first core network device. Correspondingly, the first core network device receives the fourth information sent by the second CU.

When the fourth information is determined by the first core network device, the method 300 further includes step 363 to step 365.

Step 363: The second CU sends the third information to the first core network device. Correspondingly, the first core network device receives the third information sent by the second CU.

Step 364: The first core network device generates the fourth information based on the third information.

Step 365: The first core network device sends the fourth information to the second CU. Correspondingly, the second CU receives the fourth information sent by the first core network device.

Optionally, the method 300 may further include step 370.

Step 370: The second CU sends the fourth information to the at least one third device. Correspondingly, the at least one third device receives the fourth information sent by the second CU.

The third device includes the DU.

The second DU sends, to the at least one third device, an identifier of an area covered by the second DU at each location. Therefore, flexibility of the communication system is improved.

The method 300 further includes step 380 and step 390.

Step 380: The first core network device determines a third CU corresponding to a first area identifier at a first moment based on the second information and the fourth information, where the first area identifier is an area identifier in an area identifier list of the to-be-paged terminal device, and the third CU is one of the first CU and the second CU.

For example, when the first moment is a moment a, the to-be-paged terminal device is located in a tracking area A. In this case, at the moment a, a TAC of an area covered by the first DU is a TAC a corresponding to the tracking area A, so that the first core network device determines the first CU as the third CU. In other words, in this case, the to-be-paged terminal device is in the area covered by the first DU.

For another example, when the first moment is a moment 2, the to-be-paged terminal device is located in a tracking area 2. In this case, at the moment 2, a TAC of an area covered by the second DU is a TAC 2 corresponding to the tracking area 2, so that the first core network device determines the second CU as the third CU. In other words, in this case, the to-be-paged terminal device is in the area covered by the second DU.

Step 390: The first core network device sends a first paging message to the third CU. Correspondingly, the third CU receives the first paging message sent by the first core network device.

The first paging message includes the first area identifier and an identifier of the to-be-paged terminal device, After the third CU receives the first paging message, the third CU searches for the to-be-paged terminal device, and sends the first paging message to all terminal devices in a first area. All the terminal devices each determine whether an identifier of the terminal device is the same as the identifier of the to-be-paged terminal device in the first paging message. When the identifier of the terminal device is the same as the identifier of the to-be-paged terminal device in the first paging message, the terminal device initiates an RRC setup request to establish a radio link to the third CU. After paging is stopped, if the third CU has not found the to-be-paged terminal device, to be specific, the to-be-paged terminal device is in an RRC third state, the third CU performs step 391 and step 392.

Step 391: The third CU determines a fourth CU corresponding to a first area identifier at the first moment based on second information corresponding to another device, where the first area identifier is an area identifier in the area identifier list of the to-be-paged terminal device.

For example, when the first moment is a moment 1, the to-be-paged terminal device is located in a tracking area 1. In this case, at the moment 1, a RANAC of an area covered by the fourth DU is a RANAC corresponding to the tracking area 1. In this case, the to-be-paged terminal device is in the area covered by the fourth DU.

For another example, when the first moment is a moment b, the to-be-paged terminal device is located in a tracking area 2. In this case, at the moment b, a RANAC of an area covered by the fourth DU is a RANAC b corresponding to the tracking area 2. In other words, in this case, the to-be-paged terminal device is in the area covered by the fourth DU.

Step 392: The third CU sends the first paging message to the fourth CU. Correspondingly, the fourth CU receives the first paging message sent by the third CU.

The first paging message includes the first area identifier and the to-be-paged terminal device.

After the fourth CU receives the first paging message, the fourth CU searches for the to-be-paged terminal device, and sends the first paging message to all terminal devices in a first area. All the terminal devices each determine whether an identifier of the terminal device is the same as the identifier of the to-be-paged terminal device in the first paging message. When the identifier of the terminal device is the same as the identifier of the to-be-paged terminal device in the first paging message, the terminal device initiates an RRC setup request to establish a radio link to the fourth CU.

The foregoing describes in detail the communication methods in embodiments of this application with reference to FIG. 1 to FIG. 10B. The following describes in detail apparatuses in embodiments of this application with reference to FIG. 11 to FIG. 16. It should be understood that apparatuses shown in FIG. 11 to FIG. 16 can implement one or more steps in the method procedures shown in FIG. 7 to FIG. 10B. To avoid repetition, details are not described herein again.

Figure 11:
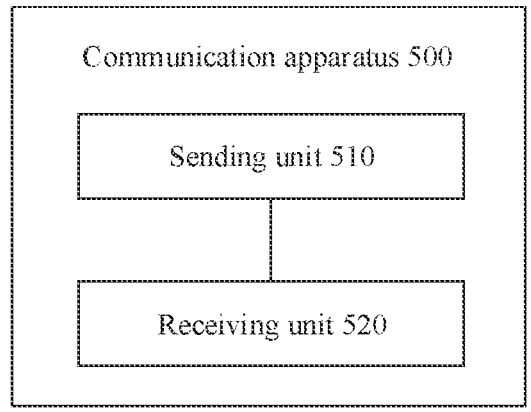
FIG. 11 is a schematic diagram of a communication apparatus 500 according to this application.

FIG. 11 is a schematic diagram of a communication apparatus 500 according to this application. The communication apparatus 500 includes a sending unit 510 and a receiving unit 520. The apparatus 500 is configured to perform the procedures and steps corresponding to the first device in the method 200.

The sending unit 510 is configured to send first information, where the first information is used to indicate N moments and location information of the first device at the N moments.

The receiving unit 520 is configured to obtain second information, where the second information is used to indicate a correspondence between the N moments and M area identifiers, or the second information is used to indicate a correspondence between N locations and M area identifiers.

Optionally, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M groups of area identifiers.

Optionally, the area identifier includes a TAC or a RANAC.

Optionally, the sending unit 510 is further configured to: send the second information to at least one third device.

Optionally, the second information is included in an Xn interface setup request message.

In a possible implementation, the communication apparatus 500 may be an access network device, for example, the following base station 80. A function of the sending unit 510 and a function of the receiving unit 520 may be implemented by using an RRU 801 of the base station 80.

Figure 12:
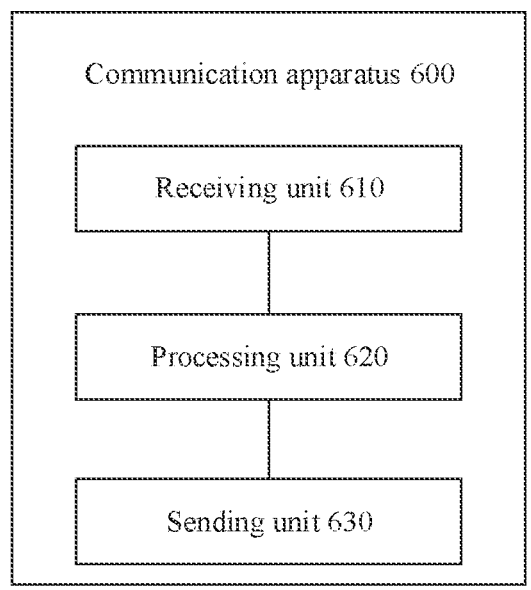
FIG. 12 is a schematic diagram of a communication apparatus 600 according to this application.

FIG. 12 is a schematic diagram of a communication apparatus 600 according to this application. The communication apparatus 600 includes a receiving unit 610, a processing unit 620, and a sending unit 630.

In a possible implementation, the apparatus 700 is configured to perform the procedures and steps corresponding to the first core network device in the method 200.

The receiving unit 610 is configured to receive first information sent by a first device, where the first information is used to indicate N moments and location information of the first device at the N moments.

The processing unit 620 is configured to generate second information based on the first information, where the second information is used to indicate a correspondence between the N moments and M area identifiers, or the second information is used to indicate a correspondence between N locations and M area identifiers.

The sending unit 630 is configured to send the second information to the first device.

Optionally, the first information includes the N moments and N groups of latitude and longitude information of the first device at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the first device at the N moments, each of the N groups of latitude and longitude information includes latitude and longitude information of at least one cell, and the at least one cell is at least one cell covered by the first device; and the second information includes a correspondence between the N moments and M groups of area identifiers, or the second information includes a correspondence between the N groups of latitude and longitude information and M area identifiers.

Optionally, the receiving unit 610 is further configured to receive third information sent by a fourth device, where the third information is used to indicate N moments and location information of the fourth device at the N moments; the processing unit 620 is further configured to generate fourth information based on the third information, where the fourth information is used to indicate a correspondence between the N moments and M area identifiers, or the fourth information is used to indicate a correspondence between N locations and M area identifiers; the sending unit 630 is further configured to send the fourth information to the fourth device; the processing unit 620 is further configured to determine a fifth device corresponding to a first area identifier at a first moment based on the second information and the fourth information, where the first area identifier is an area identifier in an area identifier list of a to-be-paged terminal device, and the fifth device is one of the first device and the fourth device: and the sending unit 630 is further configured to send a first paging message to the fifth device.

Optionally, the third information includes the N moments and N groups of latitude and longitude information of the fourth device at the N moments; and the fourth information includes the correspondence between the N moments and the M area identifiers, or the fourth information includes a correspondence between N pieces of latitude and longitude information and the M area identifiers.

Optionally, the third information includes the N moments and N groups of latitude and longitude information of the fourth device at the N moments, each of the N groups of latitude and longitude information includes latitude and longitude information of at least one cell, and the at least one cell is at least one cell covered by the fourth device; and the fourth information includes a correspondence between the N moments and M groups of area identifiers, or the fourth information includes a correspondence between the N groups of latitude and longitude information and M area identifiers.

Optionally, the area identifier includes a TAC or a RANAC.

Optionally, the first information is included in an NG interface setup message or an Xn interface setup request message, and the second information is included in an NG interface setup response message or an Xn interface setup request message.

Optionally, the third information is included in an NG interface setup message or an Xn interface setup request message, and the fourth information is included in an NG interface setup response message or an Xn interface setup request message.

In a possible implementation, the apparatus 700 is configured to perform the procedures and steps corresponding to the first core network device in the method 300.

The receiving unit 610 is configured to receive first information sent by a second apparatus, where the second apparatus includes a distributed unit (DU), and the first information is used to indicate N moments and location information of a first apparatus at the N moments.

The processing unit 620 is configured to generate second information based on the first information, where the second information is used to indicate a correspondence between the N moments and M area identifiers, or the second information is used to indicate a correspondence between N locations and M area identifiers.

The sending unit 630 is configured to send the second information to the second apparatus.

Optionally, the first information includes the N moments and N groups of latitude and longitude information of the first apparatus at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the first apparatus at the N moments, each of the N groups of latitude and longitude information includes latitude and longitude information of at least one cell, and the at least one cell is at least one cell covered by the first apparatus; and the second information includes a correspondence between the N moments and M groups of area identifiers, or the second information includes a correspondence between the N groups of latitude and longitude information and M area identifiers.

Optionally, the receiving unit 610 is further configured to receive third information sent by a fourth apparatus, where the third information is used to indicate N moments and location information of the fourth apparatus at the N moments; the processing unit 620 is further configured to generate fourth information based on the third information, where the fourth information is used to indicate a correspondence between the N moments and M area identifiers, or the fourth information is used to indicate a correspondence between N locations and M area identifiers; the sending unit 630 is further configured to send the fourth information to the fourth apparatus; the processing unit 620 is further configured to determine a fifth apparatus corresponding to a first area identifier at a first moment based on the second information and the fourth information, where the first area identifier is an area identifier in an area identifier list of a to-be-paged terminal apparatus, and the fifth apparatus is one of the first apparatus and the fourth apparatus; and the sending unit 630 is further configured to send a first paging message to the fifth apparatus.

Optionally, the third information includes the N moments and N groups of latitude and longitude information of the fourth apparatus at the N moments; and the fourth information includes the correspondence between the N moments and the M area identifiers, or the fourth information includes a correspondence between N pieces of latitude and longitude information and the M area identifiers.

Optionally, the third information includes the N moments and N groups of latitude and longitude information of the fourth apparatus at the N moments, each of the N groups of latitude and longitude information includes latitude and longitude information of at least one cell, and the at least one cell is at least one cell covered by the fourth apparatus; and the fourth information includes a correspondence between the N moments and M groups of area identifiers, or the fourth information includes a correspondence between the N groups of latitude and longitude information and M area identifiers.

Optionally, the area identifier includes a TAC or a RANAC.

Optionally, the first information is included in an NG interface setup message or an Xn interface setup request message, and the second information is included in an NG interface setup response message or an Xn interface setup request message.

Optionally, the third information is included in an NG interface setup message or an Xn interface setup request message, and the fourth information is included in an NG interface setup response message or an Xn interface setup request message.

In a possible implementation, the apparatus 700 is configured to perform the procedures and steps corresponding to the first core network device in the method 200.

The receiving unit 610 is configured to receive first information sent by a first distributed unit (DU), where the first information is used to indicate N moments and location information of the first DU at the N moments.

The processing unit 620 is configured to generate second information based on the first information, where the second information is used to indicate a correspondence between the N moments and M area identifiers, or the second information is used to indicate a correspondence between N locations and M area identifiers.

The sending unit 630 is configured to send the second information to the first CU.

Optionally, the first information includes the N moments and N groups of latitude and longitude information of the first DU at the N moments: and the second information includes the correspondence between the N moments and the M area identifiers, or the second information includes a correspondence between N pieces of latitude and longitude information and the M area identifiers, Optionally, the first information includes the N moments and N groups of latitude and longitude information of the first DU at the N moments, each of the N groups of latitude and longitude information includes latitude and longitude information of at least one cell, and the at least one cell is at least one cell covered by the first DU; and the second information includes a correspondence between the N moments and M groups of area identifiers, or the second information includes a correspondence between the N groups of latitude and longitude information and M area identifiers.

Optionally, the receiving unit 610 is further configured to receive third information sent by a second CU, where the third information is used to indicate N moments and location information of a second DU at the N moments; the processing unit 620 is further configured to generate fourth information based on the third information, where the fourth information is used to indicate a correspondence between the N moments and M area identifiers, or the fourth information is used to indicate a correspondence between N locations and M area identifiers; the sending unit 630 is further configured to send the fourth information to the second CU: the processing unit 620 is further configured to determine a third CU corresponding to a first area identifier at a first moment based on the second information and the fourth information, where the first area identifier is an area identifier in an area identifier list of a to-be-paged terminal apparatus, and the third CU is one of the first CU and the second CU; and the sending unit 630 is further configured to send a first paging message to the third CU.

Optionally, the third information includes the N moments and N groups of latitude and longitude information of a third DU at the N moments; and the fourth information includes the correspondence between the N moments and the M area identifiers, or the fourth information includes a correspondence between N pieces of latitude and longitude information and the M area identifiers.

Optionally, the third information includes the N moments and N groups of latitude and longitude information of a third DU at the N moments, each of the N groups of latitude and longitude information includes latitude and longitude information of at least one cell, and the at least one cell is at least one cell covered by the third DU; and the fourth information includes a correspondence between the N moments and M groups of area identifiers, or the fourth information includes a correspondence between the N groups of latitude and longitude information and M area identifiers, Optionally, the area identifier includes a TAC or a RANAC.

Optionally, the first information is included in an NG interface setup message or an Xn interface setup request message, and the second information is included in an NG interface setup response message or an Xn interface setup request message.

Optionally, the third information is included in an NG interface setup message or an Xn interface setup request message, and the fourth information is included in an NG interface setup response message or an Xn interface setup request message.

In a possible implementation, the communication apparatus 600 may be a core network device, for example, the following base station 80. A function of the processing unit 620 may be implemented by using a processor 8022 in the base station, and a function of the receiving unit 610 and a function of the sending unit 630 may be implemented by using an RRU 801 in the base station 80.

Figure 13:
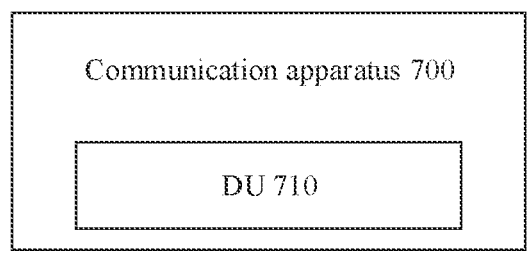
FIG. 13 is a schematic diagram of a communication apparatus 700 according to this application.

FIG. 13 is a schematic diagram of a communication apparatus 700 according to this application. The first apparatus 700 includes a DU 710. The apparatus 700 may be a first apparatus, or may be a chip in the first apparatus.

In a possible implementation in which the apparatus 700 is the first apparatus, the apparatus 700 is configured to perform the procedures and steps corresponding to the DU in the method 300, The DU 710 is configured to send first information to a second apparatus, where the first information is used to indicate N moments and location information of the DU at the N moments.

The DU 710 is farther configured to receive second information sent by the second apparatus, where the second information is generated by the second apparatus, or the second information is generated by a first core network device.

The second information is used to indicate a correspondence between the N moments and M area identifiers, or the second information is used to indicate a correspondence between N locations and M area identifiers.

Optionally, the first information includes the N moments and N groups of latitude and longitude information of the DU at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the DU at the N moments, each of the N groups of latitude and longitude information includes latitude and longitude information of at least one cell, and the at least one cell is at least one cell covered by the DU; and the second information includes a correspondence between the N moments and M groups of area identifiers, or the second information includes a correspondence between the N groups of latitude and longitude information and M groups of area identifiers.

Optionally, the first information is included in an F1 interface setup message or a first configuration update message; and the second information is included in an F1 interface setup response message or a first configuration update response message.

Optionally, the area identifier includes a TAC or a RANAC.

Figure 14:
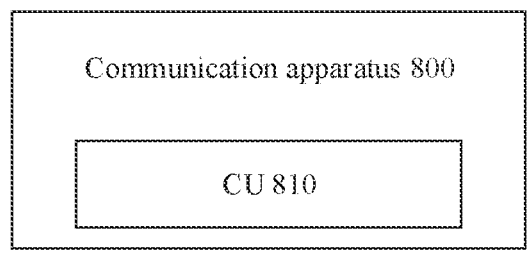
FIG. 14 is a schematic diagram of a communication apparatus 800 according to this application.

FIG. 14 is a schematic diagram of a communication apparatus 800 according to this application. The communication apparatus 800 includes a CU 810. The apparatus 800 may be a second apparatus, or may be a chip in the second apparatus.

In a possible implementation in which the apparatus 800 is the second apparatus, the apparatus 600 is configured to perform the procedures and steps corresponding to the CU in the method 300.

The CU 810 is configured to receive first information sent by a first apparatus, where the first information is used to indicate N moments and location information of the first apparatus at the N moments.

The CU 810 is further configured to obtain second information, where the second information is used to indicate a correspondence between the N moments and M area identifiers, or the second information is used to indicate a correspondence between N locations and M area identifiers.

The CU 810 is further configured to send the second information to the first apparatus.

Optionally, the first information includes the N moments and N groups of latitude and longitude information of the first apparatus at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the first apparatus at the N moments, each of the N groups of latitude and longitude information includes latitude and longitude information of at least one cell, and the at least one cell is at least one cell covered by the first apparatus; and the second information includes a correspondence between the N moments and M groups of area identifiers, or the second information includes a correspondence between the N groups of latitude and longitude information and M groups of area identifiers.

Optionally, the first information is included in an F1 interface setup message or a first configuration update message; and the second information is included in an F1 interface setup response message or a first configuration update response message.

Optionally, the area identifier includes a TAC or a RANAC.

Optionally, the CU 810 is further specifically configured to: generate the second information; or send the first information to a first core network device, and receive the second information sent by the first core network device.

Optionally, the CU 810 is further configured to: send the second information to at least one third apparatus.

The third apparatus includes a CU.

Optionally, the second information is included in an Xn interface setup request message.

Figure 15:
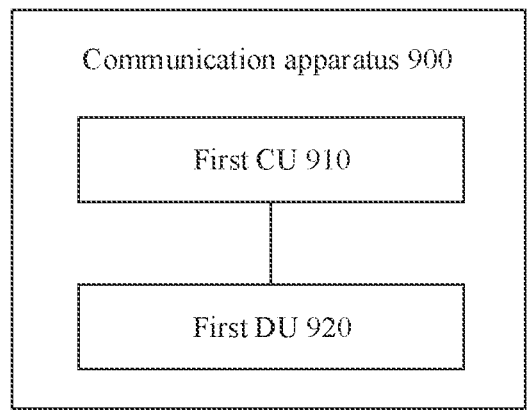
FIG. 15 is a schematic diagram of a communication apparatus 900 according to this application.

FIG. 15 is a schematic diagram of a communication apparatus 900 according to this application. The communication apparatus 800 includes a first CU 910 and a first DU 920. The first DU 920 in the apparatus 900 is configured to perform the procedures and steps corresponding to the DU in the method 300. The first CU 910 in the apparatus 900 is configured to perform the procedures and steps corresponding to the CU in the method 300.

The first CU 910 is configured to receive first information sent by the first DU 920, where the first information is used to indicate N moments and location information of the first DU 920 at the N moments.

The first CU 910 obtains second information, where the second information is used to indicate a correspondence between the N moments and M area identifiers, or the second information is used to indicate a correspondence between N locations and M area identifiers.

The first CU 910 is further configured to send the second information to the first DU 920.

Optionally, the first information includes the N moments and N groups of latitude and longitude information of the first DU at the N moments; and the second information includes the correspondence between the N moments and the M area identifiers, or the second information includes a correspondence between N pieces of latitude and longitude information and the M area identifiers.

Optionally, the first information includes the N moments and N groups of latitude and longitude information of the first DU at the N moments, each of the N groups of latitude and longitude information includes latitude and longitude information of at least one cell, and the at least one cell is at least one cell covered by the first DU; and the second information includes a correspondence between the N moments and M groups of area identifiers, or the second information includes a correspondence between the N groups of latitude and longitude information and M groups of area identifiers.

Optionally, the first information is included in an F1 interface setup message or a first configuration update message; and the second information is included in an F1 interface setup response message or a first configuration update response message.

Optionally, the area identifier includes a TAC or a RANAC.

Optionally, the first CU 910 is further specifically configured to: generate the second information; or send the first information to a first core network device, and receive the second information sent by the first core network device.

Optionally, the first CU 910 is further configured to: send the second information to at least one third apparatus.

Figure 16:
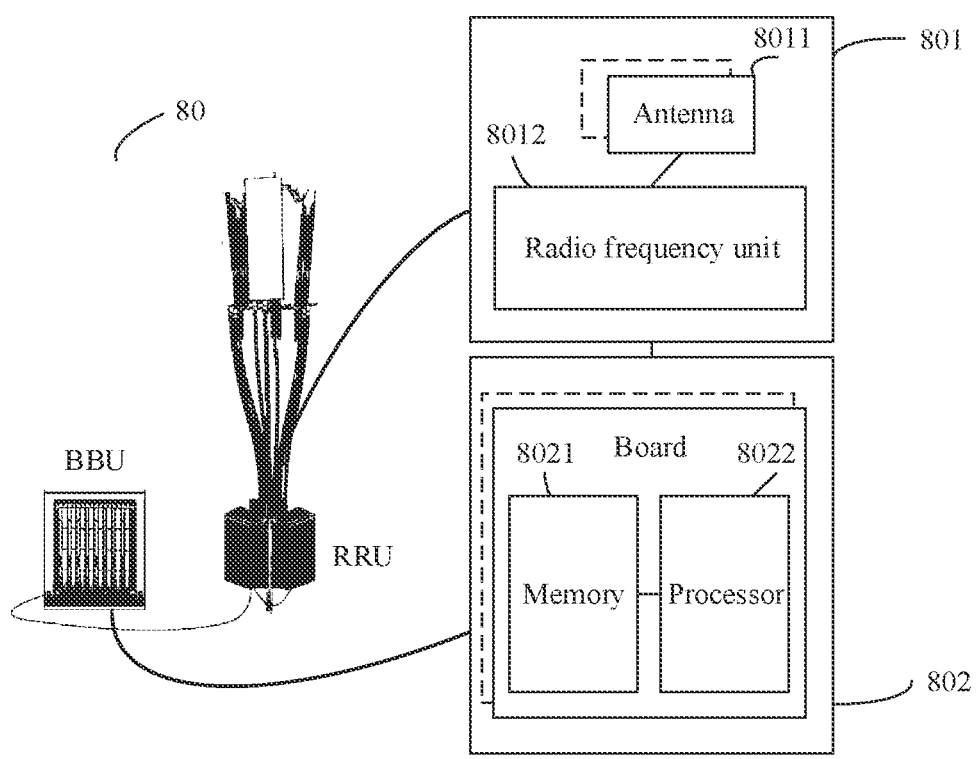
FIG. 16 is a schematic diagram of a structure of an access network device according to this application.

Optionally, the second information is included in an Xn interface setup request message, The following describes a structure of the access network device in embodiments of this application with reference to FIG. 16.

FIG. 16 is a schematic diagram of a structure of an access network device according to an embodiment of this application, for example, may be a schematic diagram of a structure of a base station. As shown in FIG. 16, the base station may be used in the system shown in FIG. 1, to perform a function of the access network device in the foregoing method embodiments. The base station 80 may include one or more radio frequency units such as a remote radio unit (RRU) 801 and one or more baseband units (BBUs) (which may also be referred to as digital units (DUs)) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to send and receive a radio frequency signal and perform conversion between the radio frequency signal and a baseband signal. The BBU 802 is mainly configured to: perform baseband processing, control the base station, and so on. The RRU 801 and the BBU 802 may be physically disposed together, or may be physically disposed separately, that is, in a distributed base station.

The BBU 802, also referred to as a processing unit, is a control center of the base station, and is mainly configured to complete baseband processing functions such as channel coding, multiplexing, modulation, and spectrum spreading. For example, the BBU (the processing unit) 802 may be configured to control the base station to perform Operation procedures related to the access network device in the foregoing method embodiments.

In an example, the BBU 802 may include one or more hoards. A plurality of boards may jointly support a radio access network (for example, an LTE network) of a single access standard, or may separately support radio access networks (for example, an LTE network, a 5G network, or another network) of different access standards. The BBU 802 further includes a memory 8021 and a processor 8022. The memory 8021 is configured to store necessary instructions and data. For example, the memory 8021 stores a correspondence between a codebook index and a precoding matrix in the foregoing embodiments. The processor 8022 is configured to control the base station to perform a necessary action, for example, configured to control the base station to perform the operation procedure related to the access network device in the foregoing method embodiments. The memory 8021 and the processor 8022 may serve one or more boards. In other words, a memory and a processor may be separately disposed on each board. Alternatively, a plurality of boards may share a same memory and a same processor. In addition, a necessary circuit may be further disposed on each board.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative descriptions, many forms of random access memories (RAMS) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM).

According to the method provided in embodiments of this application, this application further provides a computer program product. The computer program product includes computer program code. When the computer program code is run on a computer, the computer is enabled to perform the method according to any one of the embodiments shown in FIG. 7 to FIG. 1013, According to the method provided in embodiments of this application, this application further provides a computer-readable medium. The computer-readable medium stores program code. When the program code is run on a computer, the computer is enabled to perform the method according to any one of the embodiments shown in FIG. 7 to FIG. 10B, According to the method provided in embodiments of this application, this application further provides a chip system. The chip system includes a processor, configured to invoke a computer program from a memory and run the computer program, so that a communication device on which the chip system is installed is enabled to perform the method according to any one of the embodiments shown in FIG. 7 to FIG. 10B.

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm steps may be implemented by electronic hardware or a combination of computer software and, electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving first information sent by a satellite, wherein the first information indicates N moments and location information of the satellite at the N moments;
generating second information based on the first information, wherein the second information indicates a correspondence between the N moments and M area identifiers, or the second information indicates a correspondence between N locations and M area identifiers, and N and M are positive integers, and each one of the M area identifiers corresponds to an area covered by the satellite at a respective moment or a respective location; and sending the second information to the satellite.

2. The communication method according to claim 1, wherein:
the first information comprises the N moments and N groups of latitude and longitude information of the satellite at the N moments; and
the second information comprises the correspondence between the N moments and the M area identifiers, or the second information comprises a correspondence between N pieces of latitude and longitude information and the M area identifiers.

3. The communication method according to claim 1, wherein:
the first information comprises the N moments and N groups of latitude and longitude information of the satellite at the N moments, wherein each of the N groups of latitude and longitude information comprises latitude and longitude information of at least one cell, and wherein the at least one cell is at least one cell covered by the satellite; and
the second information comprises a correspondence between the N moments and M groups of area identifiers, or the second information comprises a correspondence between the N groups of latitude and longitude information and M area identifiers.

4. The communication method according to claim 1, wherein the communication method further comprises:
receiving third information sent by the satellite, wherein the third information indicates N moments and location information of a fourth device at the N moments;
generating fourth information based on the third information, wherein the second information indicates a correspondence between the N moments and M area identifiers, or the second information indicates a correspondence between N locations and M area identifiers;
sending the fourth information to the fourth device;
determining a fifth device corresponding to a first area identifier at a first moment based on the second information and the fourth information, wherein the first area identifier is an area identifier in an area identifier list of a to-be-paged terminal device, and the fifth device is one of the satellite and the fourth device; and
sending a first paging message to the fifth device.

5. The communication method according to claim 4, wherein:
the third information comprises the N moments and N groups of latitude and longitude information of the fourth device at the N moments; and
the fourth information comprises the correspondence between the N moments and the M area identifiers, or the fourth information comprises a correspondence between N pieces of latitude and longitude information and the M area identifiers.

6. The communication method according to claim 5, wherein:
the third information comprises the N moments and N groups of latitude and longitude information of the fourth device at the N moments, wherein each of the N groups of latitude and longitude information comprises latitude and longitude information of at least one cell, and wherein the at least one cell is at least one cell covered by the fourth device; and
the fourth information comprises a correspondence between the N moments and M groups of area identifiers, or the fourth information comprises a correspondence between the N groups of latitude and longitude information and M area identifiers.

7. The communication method according to claim 1, wherein the first information is included in an NG interface setup message, and the second information is included in an NG interface setup response message.

8. The communication method according to claim 1, wherein each of the M area identifiers comprises a tracking area code (TAC) or an access network area code (RANAC).

9. A first device, configured as a satellite and comprising:
at least one processor; and
one or more memories coupled to the at least one processor and storing program instructions for execution by the at least one processor to:
send first information, wherein the first information indicates N moments and location information of the satellite at the N moments; and
obtain second information, wherein the second information indicates a correspondence between the N moments and M area identifiers, or the second information indicates a correspondence between N locations and M area identifiers, and N and M are positive integers, and wherein each one of the M area identifiers corresponds to an area covered by the satellite at a respective moment or a respective location.

10. The first device according to claim 9, wherein:
the first information comprises the N moments and N groups of latitude and longitude information of the satellite at the N moments; and
the second information comprises the correspondence between the N moments and the M area identifiers, or the second information comprises a correspondence between N pieces of latitude and longitude information and the M area identifiers.

11. The first device according to claim 9, wherein:
the first information comprises the N moments and N groups of latitude and longitude information of the satellite at the N moments, wherein each of the N groups of latitude and longitude information comprises latitude and longitude information of at least one cell, and wherein the at least one cell is at least one cell covered by the satellite; and
the second information comprises a correspondence between the N moments and M groups of area identifiers, or the second information comprises a correspondence between the N groups of latitude and longitude information and M groups of area identifiers.

12. The first device according to claim 9, wherein the first information is included in an NG interface setup message, and the second information is included in an NG interface setup response message.

13. The first device according to claim 9, wherein each of the M area identifiers comprises a tracking area code (TAC) or a access network area code (RANAC).

14. A second device, comprising:
at least one processor; and
one or more memories coupled to the at least one processor and storing program instructions for execution by the at least one processor to:

receive first information sent by a satellite, wherein the first information indicates N moments and location information of the satellite at the N moments;

generate second information based on the first information, wherein the second information indicates a correspondence between the N moments and M area identifiers, or the second information indicates a correspondence between N locations and M area identifiers, and N and M are positive integers, and wherein each one of the M area identifiers corresponds to an area covered by the satellite at a respective moment or a respective location; and send the second information to the satellite.

15. The second device according to claim 14, wherein:
the first information comprises the N moments and N groups of latitude and longitude information of the satellite at the N moments; and
the second information comprises the correspondence between the N moments and the M area identifiers, or the second information comprises a correspondence between N pieces of latitude and longitude information and the M area identifiers.

16. The second device according to claim 14, wherein:
the first information comprises the N moments and N groups of latitude and longitude information of the satellite at the N moments, wherein each of the N groups of latitude and longitude information comprises latitude and longitude information of at least one cell, and wherein the at least one cell is at least one cell covered by the satellite; and
the second information comprises a correspondence between the N moments and M groups of area identifiers, or the second information comprises a correspondence between the N groups of latitude and longitude information and M area identifiers.

17. The second device according to claim 14, wherein the one or more memories store the program instructions for execution by the at least one processor to:
receive third information sent by a fourth device, wherein the third information indicates N moments and location information of the fourth device at the N moments;

generate fourth information based on the third information, wherein the fourth information indicates a correspondence between the N moments and M area identifiers, or the fourth information indicates a correspondence between N locations and M area identifiers;

send the fourth information to the fourth device;

determine a fifth device corresponding to a first area identifier at a first moment based on the second information and the fourth information, wherein the first area identifier is an area identifier in an area identifier list of a to-be-paged terminal device, and the fifth device is one of the satellite and the fourth device; and send a first paging message to the fifth device.

18. The second device according to claim 17, wherein:
the third information comprises the N moments and N groups of latitude and longitude information of the fourth device at the N moments; and
the fourth information comprises the correspondence between the N moments and the M area identifiers, or the fourth information comprises a correspondence between N pieces of latitude and longitude information and the M area identifiers.

19. The second device according to claim 17, wherein:
the third information comprises the N moments and N groups of latitude and longitude information of the fourth device at the N moments, wherein each of the N groups of latitude and longitude information comprises latitude and longitude information of at least one cell, and wherein the at least one cell is at least one cell covered by the fourth device; and
the fourth information comprises a correspondence between the N moments and M groups of area identifiers, or the fourth information comprises a correspondence between the N groups of latitude and longitude information and M area identifiers.

20. The second device according to claim 14, wherein the first information is included in an NG interface setup message, and the second information is included in an NG interface setup response message.

* * * * *

UNITED STATES PATENT AND TRADEMARK OFFICE
CERTIFICATE OF CORRECTION

| | | |
|---|---|---|
| PATENT NO. | : 12,302,288 B2 | Page 1 of 1 |
| APPLICATION NO. | : 17/703118 | |
| DATED | : May 13, 2025 | |
| INVENTOR(S) | : Yedan Wu et al. | |

It is certified that error appears in the above-identified patent and that said Letters Patent is hereby corrected as shown below:

In the Specification

In Column 1, In Line 7, Delete "confirmation" and insert -- continuation --.

In the Claims

In Column 56, In Line 14 (Approx.), In Claim 8, delete "an" and insert -- a radio --.

In Column 56, In Line 62, In Claim 13, after "a" insert -- radio --.

Signed and Sealed this
Sixteenth Day of September, 2025

Coke Morgan Stewart
*Acting Director of the United States Patent and Trademark Office*